US011904612B2

(12) United States Patent
Eto

(10) Patent No.: US 11,904,612 B2
(45) Date of Patent: Feb. 20, 2024

(54) WASTE LIQUID COLLECTION APPARATUS AND INKJET RECORDING APPARATUS PROVIDED WITH SAME

(71) Applicant: KYOCERA Document Solutions Inc., Osaka (JP)

(72) Inventor: Daisuke Eto, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 137 days.

(21) Appl. No.: 17/413,862

(22) PCT Filed: Dec. 12, 2019

(86) PCT No.: PCT/JP2019/048797
§ 371 (c)(1),
(2) Date: Jun. 14, 2021

(87) PCT Pub. No.: WO2020/129820
PCT Pub. Date: Jun. 25, 2020

(65) Prior Publication Data
US 2022/0055368 A1 Feb. 24, 2022

(30) Foreign Application Priority Data
Dec. 17, 2018 (JP) ................................ 2018-235611

(51) Int. Cl.
*B41J 2/17* (2006.01)
*B41J 2/165* (2006.01)

(52) U.S. Cl.
CPC ......... *B41J 2/1721* (2013.01); *B41J 2/16538* (2013.01); *B41J 2002/1742* (2013.01)

(58) Field of Classification Search
None
See application file for complete search history.

(56) References Cited

U.S. PATENT DOCUMENTS

2011/0122192 A1* 5/2011 Takahashi ............ B41J 2/16585 347/33
2016/0075138 A1* 3/2016 Hashimoto .......... B41J 2/16523 347/29

FOREIGN PATENT DOCUMENTS

JP 2006-15637 1/2006

OTHER PUBLICATIONS

International Search Report dated Mar. 10, 2020.

* cited by examiner

*Primary Examiner* — Alejandro Valencia
(74) *Attorney, Agent, or Firm* — Gerald E. Hespos; Michael J. Porco

(57) ABSTRACT

A waste liquid collection apparatus includes a waste liquid tray, a collection tank, a collection pump, and a circulation pump. The waste liquid tray includes a waste liquid receiving surface inclined downward to receive a waste liquid discharged from a head unit and allow the waste liquid to flow from an upper end to a lower end of the waste liquid receiving surface, and a waste liquid discharge part that is disposed adjacent to the lower end of the waste liquid receiving surface to discharge the waste liquid. The collection pump feeds a part of the waste liquid discharged from the waste liquid discharge part to the collection tank. The circulation pump returns another part of the waste liquid discharged from the waste liquid discharge part to the upper end of the waste liquid receiving surface to circulate the other part of the waste liquid.

6 Claims, 22 Drawing Sheets

WASTE LIQUID COLLECTION APPARATUS AND INKJET RECORDING APPARATUS PROVIDED WITH SAME

TECHNICAL FIELD

The present invention relates to a waste liquid collection apparatus that collects liquid discharged from a head unit as waste liquid, and an inkjet recording apparatus including the waste liquid collection apparatus.

BACKGROUND ART

As an image forming apparatus such as a printer, there is known an inkjet recording apparatus that discharges ink onto a sheet to form an image. This kind of inkjet recording apparatus includes a head unit provided with an ink discharge nozzle that discharges ink.

In the inkjet recording apparatus, when bubbles, foreign matters, or thickened ink is present in the ink discharge nozzle, normal ink discharge cannot be performed, and thus, maintenance processing for the head unit is performed during a pause in image forming processing on a sheet (e.g., see JP 2006-15637 A). In the maintenance processing of the head unit, a cleaning liquid or the like is supplied to the head unit.

Waste liquids generated in the maintenance processing for the head unit flow through a waste liquid flow path and are collected in a waste liquid tank. Waste liquids containing ink dry and thicken in the waste liquid flow path as time elapses, and thus may decrease in fluidity and stagnate in the waste liquid flow path to adhere in an aggregated state. In this case, the waste liquids cannot be appropriately collected.

SUMMARY OF INVENTION

It is an object of the present invention to provide a waste liquid collection apparatus capable of appropriately collecting a waste liquid generated in maintenance processing of a head unit, and an inkjet recording apparatus including the waste liquid collection apparatus.

A waste liquid collection apparatus according to an aspect of the present invention collects a liquid discharged from a head unit as a waste liquid in maintenance processing for the head unit. The waste liquid collection apparatus includes a waste liquid tray, a collection tank, a collection pump, and a circulation pump.

The waste liquid tray includes a waste liquid receiving surface inclined downward to receive the waste liquid discharged from the head unit and allow the waste liquid to flow from an upper end to a lower end of the waste liquid receiving surface, and a waste liquid discharge part that is disposed adjacent to the lower end of the waste liquid receiving surface to discharge the waste liquid having flowed along the waste liquid receiving surface. The collection tank collects the waste liquid. The collection pump feeds a part of the waste liquid discharged from the waste liquid discharge part to the collection tank. The circulation pump returns another part of the waste liquid discharged from the waste liquid discharge part to the upper end of the waste liquid receiving surface to circulate the other part of the waste liquid.

An inkjet recording apparatus according to another aspect of the present invention includes a head unit capable of discharging ink, a purge mechanism, and the waste liquid collection apparatus. The purge mechanism performs purge processing of discharging a pressurized liquid from the head unit as maintenance processing for the head unit. The waste liquid collection apparatus collects a liquid discharged from the head unit as a waste liquid when the purge processing is performed.

DESCRIPTION OF EMBODIMENTS

Figure 1:
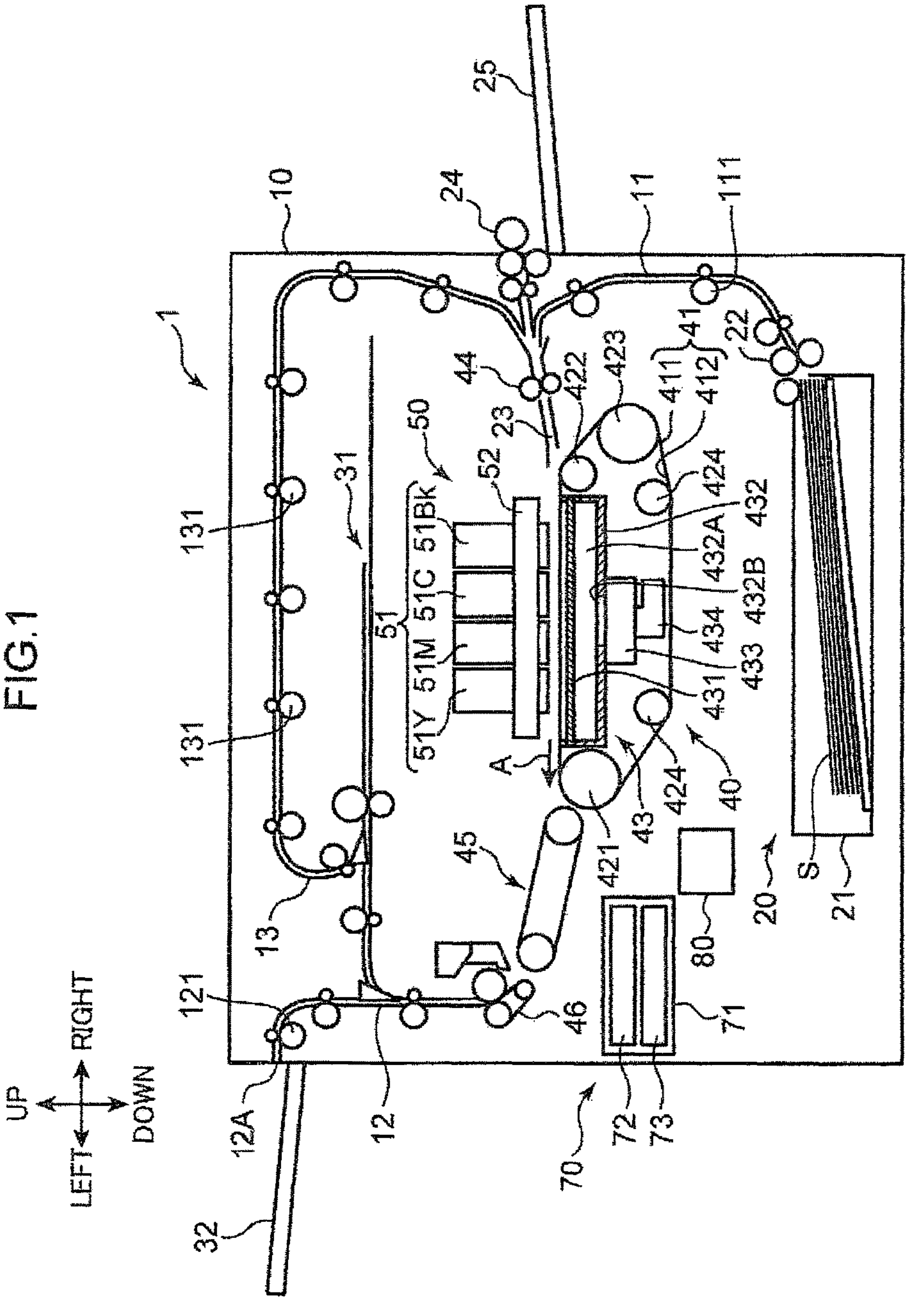
FIG. 1 is a diagram schematically illustrating an inkjet recording apparatus according to an embodiment of the present invention.

Hereinafter, an embodiment of the present invention will be described with reference to the drawings. Although in the drawings, directions such as front and rear, left and right, and up and down, are indicated, the directions are indicated for convenience of description and are not intended to limit any direction. In the following description, the term, "sheet", means a copy sheet, a coated sheet, an overhead projector (OHP) sheet, a cardboard, a postcard, a tracing paper, another sheet material subjected to image forming processing, or a sheet material subjected to any processing other than image forming processing.

[General Configuration of Inkjet Recording Apparatus]

FIG. 1 is a diagram schematically illustrating an inkjet recording apparatus 1 according to an embodiment of the present invention. The inkjet recording apparatus 1 illustrated in FIG. 1 is an image forming apparatus that discharges ink droplets to form (record) an image on a sheet S.

The inkjet recording apparatus 1 includes an apparatus body 10, a sheet feeder 20, a sheet transport unit 40, an image forming unit 50, a sheet reversing portion 31, a sheet ejector 32, a maintenance unit 70, and a waste liquid collection apparatus 80.

The apparatus body 10 is a housing in the shape of a box that houses various devices for forming an image on the sheet S. The apparatus body 10 is provided with a first transport path 11, a second transport path 12, and a third transport path 13, which are transport passages of the sheet S.

The sheet feeder 20 feeds the sheet S to the first transport path 11. The sheet feeder 20 includes a sheet feeding cassette 21 and a pickup roller 22. The sheet feeding cassette 21 is detachably attached to the apparatus body 10 and houses the sheet S therein. The pickup roller 22 is disposed on the right side and at an upper end of the sheet feeding cassette 21. The pickup roller 22 draws the sheet S in the uppermost layer of a sheet bundle stored in the sheet feeding cassette 21 one by one, and feeds the sheet S in the uppermost layer to the first transport path 11.

The sheet S fed to the first transport path 11 is transported to a pair of resist rollers 44 of the sheet transport unit 40 disposed at a downstream end of the first transport path 11 by a pair of first transport rollers 111 provided in the first transport path 11. The apparatus body 10 is provided on its right side surface with a sheet feeding tray 25, and the sheet S can be placed on an upper surface portion of the sheet feeding tray 25. The sheet S placed on the sheet feeding tray 25 is fed out toward the pair of resist rollers 44 by a sheet feeding roller 24.

The pair of resist rollers 44 is a pair of transport rollers disposed at an upstream end in the sheet transport unit 40. The pair of resist rollers 44 performs skew correction of the sheet S, and feeds the sheet S toward a transport belt 41 using a sheet introduction guide 23 at timing when the image forming unit 50 performs the image forming processing. In this manner, the pair of resist rollers 44 transports the sheet S toward the image forming unit 50.

The sheet introduction guide 23 guides the sheet S fed by the pair of resist rollers 44 toward an outer peripheral surface 411 of the transport belt 41 in the sheet transport unit 40.

When a leading end of the sheet S guided by the sheet introduction guide 23 comes into contact with the outer peripheral surface 411 of the transport belt 41, the sheet S is transported in a sheet transport direction A by drive of the transport belt 41 while being held on the outer peripheral surface 411. The sheet transport direction A is a direction from the right to the left in the left-right direction.

The sheet transport unit 40 is disposed below the image forming unit 50 while facing a head unit 51. The sheet transport unit 40 transports the sheet S guided and introduced by the sheet introduction guide 23 in the sheet transport direction A to allow the sheet S to pass under the image forming unit 50. The sheet transport unit 40 includes the transport belt 41 and a suction unit 43 in addition to the pair of resist rollers 44.

The transport belt 41 is an endless belt having a width in the front-rear direction and extending in the left-right direction. The transport belt 41 is disposed facing the image forming unit 50, and transports the sheet S in the sheet transport direction A on the outer peripheral surface 411. More specifically, the transport belt 41 holds the sheet S on the outer peripheral surface 411 in a predetermined transport region facing the head unit 51 of the image forming unit 50 and transports the sheet S in the sheet transport direction A.

The transport belt 41 is stretched around a first roller 421, a second roller 422, a third roller 423, and a pair of fourth rollers 424. Inside the transport belt 41 stretched, the suction unit 43 is disposed facing an inner peripheral surface 412. The first roller 421 is a driving roller extending along the front-back direction being a width direction of the transport belt 41, and is disposed downstream of the suction unit 43 in the sheet transport direction A. The first roller 421 is rotationally driven by a drive motor (not illustrated) to circulate the transport belt 41 in a predetermined circulating direction. When the transport belt 41 circulates, the sheet S held on the outer peripheral surface 411 is transported in the sheet transport direction A.

The second roller 422 is a belt speed detection roller extending along the front-rear direction, and is disposed upstream of the suction unit 43 in the sheet transport direction A. The second roller 422 is disposed maintaining flatness of a region of the outer peripheral surface 411 of the transport belt 41, facing the head unit 51, and flatness of a region of the inner peripheral surface 412 of the transport belt 41, facing the suction unit 43, in cooperation with the first roller 421. Here, a region on the outer peripheral surface 411 of the transport belt 41, facing the head unit 51 and being located between the first roller 421 and the second roller 422, is the predetermined transport region for holding and transporting the sheet S. The second roller 422 is driven to rotate in conjunction with circulating of the transport belt 41. The second roller 422 is provided with a pulse plate (not illustrated) attached, and the pulse plate rotates integrally with the second roller 422. A rotation speed of the transport belt 41 is detected by measuring a rotation speed of the pulse plate.

The third roller 423 is a tension roller extending along the front-rear direction, and applies tension to the transport belt 41 to prevent the transport belt 41 from bending. The third roller 423 is driven to rotate in conjunction with circulating of the transport belt 41. Each of the pair of fourth rollers 424 is a guide roller extending along the left-right direction, and guides the transport belt 41 to allow the transport belt 41 to pass under the suction unit 43. The pair of fourth rollers 424 is driven to rotate in conjunction with circulating of the transport belt 41.

The transport belt 41 has a plurality of suction holes passing through from the outer peripheral surface 411 to the inner peripheral surface 412 in the thickness direction.

The suction unit 43 is disposed facing the image forming unit 50 through the transport belt 41. More specifically, the suction unit 43 is disposed facing the inner peripheral surface 412 inside the transport belt 41 stretched around the first roller 421, the second roller 422, the third roller 423, and the pair of fourth rollers 424. The suction unit 43 generates negative pressure between the sheet S held on the outer peripheral surface 411 of the transport belt 41 and the transport belt 41 to bring the sheet S into close contact with the outer peripheral surface 411 of the transport belt 41. The suction unit 43 includes a belt guide member 431, a suction housing 432, a suction device 433, and an exhaust duct 434.

The belt guide member 431 is a plate that is disposed facing a region on the inner peripheral surface 412 of the transport belt 41 between the first roller 421 and the second roller 422, and that has a width dimension substantially equal to a length of the transport belt 41 in the width direction. The belt guide member 431 constitutes an upper surface portion of the suction housing 432, and is substantially identical in shape to the suction housing 432 when viewed from above. The belt guide member 431 guides circulating movement of the transport belt 41 interlocked with rotation of the first roller 421, between the first roller 421 and the second roller 422.

The belt guide member 431 has a belt guide surface facing the inner peripheral surface 412 of the transport belt 41, the belt guide surface being provided with a plurality of grooves. The respective grooves are formed corresponding to the suction holes of the transport belt 41. The belt guide member 431 further includes through holes provided corresponding to the respective grooves. The through holes pass through the belt guide member 431 in its thickness direction in the corresponding grooves, and communicate with the respective suction holes of the transport belt 41 through the corresponding grooves.

The suction unit 43 including the belt guide member 431 configured as described above generates suction force by sucking air from a space above the transport belt 41 through the grooves and the through holes of the belt guide member 431 and the suction holes of the transport belt 41. This suction force generates an air flow (suction air) toward the suction unit 43 in the space above the transport belt 41. When the sheet S is guided onto the transport belt 41 by the sheet introduction guide 23 while covering a part of the outer peripheral surface 411 of the transport belt 41, suction force (negative pressure) acts on the sheet S to bring the sheet S into close contact with the outer peripheral surface 411 of the transport belt 41.

The suction unit 43 includes the suction housing 432 that constitutes a support frame supporting the belt guide member 431 constituting the upper surface portion of the suction housing 432 from below. The suction housing 432 is in the shape of a box having an opened upper portion, and is disposed below the transport belt 41 with the opened upper portion covered with the belt guide member 431. The suction housing 432 defines a suction space 432A in cooperation with the belt guide member 431 constituting the upper surface portion thereof. That is, a space surrounded by the suction housing 432 and the belt guide member 431 serves as the suction space 432A. The suction space 432A communicates with the suction holes of the transport belt 41 through the corresponding grooves and through holes of the belt guide member 431.

The suction housing 432 has a bottom wall portion provided with an opening 432B, and the suction device 433 is disposed corresponding to the opening 432B. The suction device 433 is connected to an exhaust duct 434. The exhaust duct 434 is connected to an exhaust port (not illustrated) provided in the apparatus body 10.

The image forming unit 50 is disposed above the sheet transport unit 40. Specifically, the image forming unit 50 is disposed above the sheet transport unit 40 while facing the outer peripheral surface 411 of the transport belt 41. The image forming unit 50 performs image forming processing on the sheet S transported in the sheet transport direction A, the sheet S being held on the outer peripheral surface 411 of the transport belt 41, to form an image. In the present embodiment, the image forming unit 50 forms an image using an image forming method of an inkjet method, and thus forms an image on the sheet S by discharging ink droplets.

Figure 2:
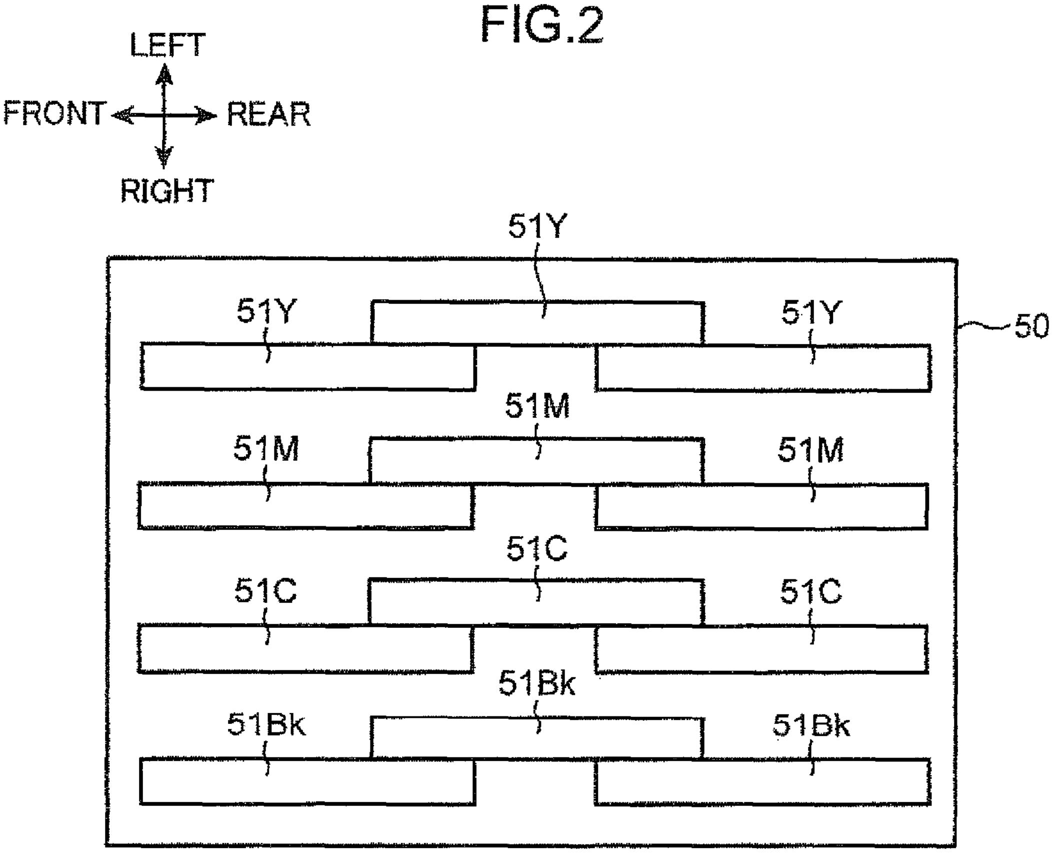
FIG. 2 is a diagram illustrating structure of an image forming unit included in an inkjet recording apparatus.

The image forming unit 50 includes head units 51Bk, 51C, 51M, and 51Y held by a head housing 52. The head unit 51Bk discharges black ink droplets, the head unit 51C discharges cyan ink droplets, the head unit 51M discharges magenta ink droplets, and the head unit 51Y discharges yellow ink droplets. The head units 51Bk, 51C, 51M, and 51Y are provided side by side from upstream to downstream in the sheet transport direction A. In the present embodiment, the image forming unit 50 includes the head units 51Bk, 51C, 51M, and 51Y that are arranged three by three in a staggered manner along the front-back direction orthogonal to the sheet transport direction A, as illustrated in FIG. 2. The head units 51Bk, 51C, 51M, and 51Y are identical in structure except for difference in color of the ink droplets to be discharged, and thus may be collectively referred to as a head unit 51.

The head unit 51 discharges ink droplets onto the sheet S, which is transported in the sheet transport direction A while being held on the outer peripheral surface 411 of the transport belt 41, to form an image on the sheet S. Specifically, the head unit 51 discharges the ink droplets toward the sheet S that is transported by the transport belt 41 and passes through a position facing the head unit 51. This allows an image to be formed on the sheet S. Details of the head unit 51 will be described later.

The sheet S on which the ink droplets are discharged from the head unit 51 and an image is formed is transported by the transport belt 41 and fed to a transport unit 45 disposed downstream of the transport belt 41 in the sheet transport direction A. The transport unit 45 further transports the sheet S received from the sheet transport unit 40 to downstream in the sheet transport direction A. A decurler unit 46 is disposed downstream of the transport unit 45. The decurler unit 46 further transports the sheet S to downstream in the sheet transport direction A while correcting curl of the sheet S received from the transport unit 45. The sheet S transported by the decurler unit 46 is fed to the second transport path 12.

The second transport path 12 is extended along a left side surface of the apparatus body 10. The sheet S fed to the second transport path 12 is transported toward a sheet discharge port 12A formed on an upper side of the apparatus body 10 by a pair of second transport rollers 121 provided in the second transport path 12, and is ejected from the sheet discharge port 12A onto the sheet ejector 32.

In contrast, when the sheet S fed to the second transport path 12 is for both sides printing in which the image forming processing of a first surface (front surface) is completed, the sheet S is fed to the sheet reversing portion 31. The sheet reversing portion 31 is a transport path branched in the middle of the second transport path 12, and is a portion where the sheet S is reversed (switched back). The sheet S turned upside down by the sheet reversing portion 31 is fed to the third transport path 13. The sheet S fed to the third transport path 13 is reversely fed by a pair of third transport rollers 131 provided in the third transport path 13, and is supplied onto the outer peripheral surface 411 of the transport belt 41 again through the pair of resist rollers 44 and the sheet introduction guide 23 while being turned upside down. The sheet S supplied onto the outer peripheral surface 411 of the transport belt 41 while being turned upside down as described above is subjected to image forming processing on a second surface (back surface) opposite to the first surface by the image forming unit 50 while being transported by the transport belt 41. The sheet S on which both sides printing has been completed passes through the second transport path 12 and is ejected onto the sheet ejector 32 from the sheet discharge port 12A.

Figure 3:
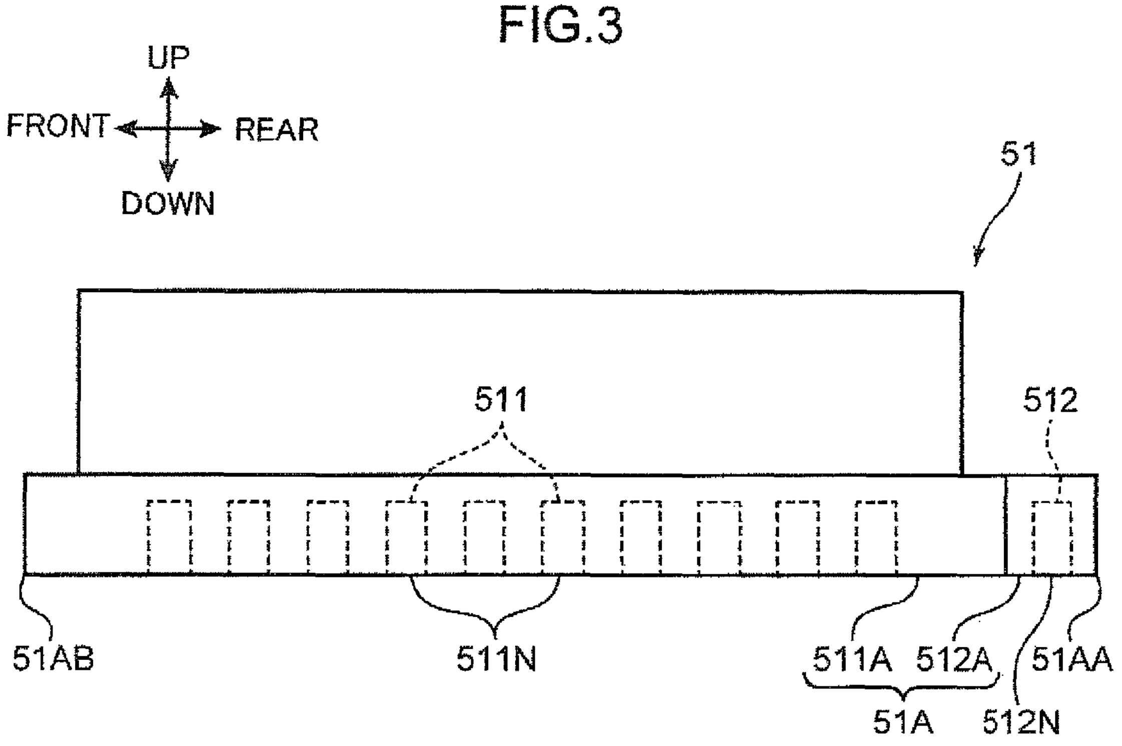
FIG. 3 is a diagram illustrating structure of a head unit included in an image forming unit.

The head unit 51 included in the image forming unit 50 will be described in detail with reference to FIG. 3. The head unit 51 is a line head in which a plurality of ink discharge nozzles 511 that discharges ink is arranged in a predetermined direction (front-back direction), and a cleaning liquid discharge nozzle 512 that discharges a cleaning liquid is disposed on one side in the arrangement direction. The head unit 51 configured as described above has a liquid discharge surface 51A including an ink discharge region 511A formed by a nozzle hole 511N of each ink discharge nozzle 511, and a cleaning liquid discharge region 512A formed by a nozzle hole 512N of the cleaning liquid discharge nozzle 512.

Unlike the ink, the cleaning liquid ejected from the cleaning liquid discharge nozzle 512 is desirably, for example, a solution having a component other than a coloring material in the ink, or a solution having a component similar to a component other than the coloring material in the ink. This is because when the cleaning liquid is mixed into the ink, characteristics of the ink are less affected. The cleaning liquid contains, for example, a solvent and water. Specifically, the cleaning liquid desirably contains ion exchange water and alcohols. When the cleaning liquid contains alcohols, permeability of the cleaning liquid can be enhanced. The cleaning liquid, more preferably, further contains glycol ethers. When the cleaning liquid contains glycol ethers, the permeability of the cleaning liquid can be enhanced. The cleaning liquid may further contain at least any one of glycerin and glycol. In this case, evaporation of the cleaning liquid can be suppressed. All or some of a surfactant, an antiseptic, and a fungicide may be added to the cleaning liquid.

When the inkjet recording apparatus 1 performs the image forming processing of forming an image on the sheet S, ink is ejected from each ink discharge nozzle 511 of the head unit 51. In contrast, when the maintenance processing on the head unit 51 is performed during a pause in the image forming processing on the sheet S, the purge processing of ejecting pressurized ink from each ink discharge nozzle 511 is performed. In this purge processing, a pressurized cleaning liquid may be discharged from the cleaning liquid discharge nozzle 512.

The maintenance processing on the head unit 51 is performed by the maintenance unit 70 illustrated in FIG. 1. The maintenance unit 70 includes a cap unit 72 and a wipe unit 73 that are mounted in a carriage 71. Details of a configuration of the maintenance unit 70 and details of the maintenance processing on the head unit 51 will be described later.

[Control System of Inkjet Recording Apparatus]

A control system of the inkjet recording apparatus 1 will be described with reference to a block diagram of FIG. 4. The inkjet recording apparatus 1 further includes a purge mechanism 60, a transport lifting mechanism 63, a carriage moving mechanism 64, a cap lifting mechanism 65, a wipe lifting mechanism 66, a blade moving mechanism 67, the waste liquid collection apparatus 80, and a controller 90.

The controller 90 includes, for example, a microcomputer incorporating a storage device such as a read only memory (ROM) that stores a control program and a flash memory that temporarily stores data, and controls operation of the inkjet recording apparatus 1 by reading out the control program. The controller 90 includes an image forming controller 91 and a maintenance controller 92. The image forming controller 91 mainly controls sheet transporting operation of the sheet transport unit 40 and image forming operation of the image forming unit 50, and performs the image forming processing on the sheet S.

The maintenance controller 92 controls the purge mechanism 60, the transport lifting mechanism 63, the carriage moving mechanism 64, the cap lifting mechanism 65, the wipe lifting mechanism 66, and the blade moving mechanism 67 to perform the maintenance processing on the head unit 51 during a pause of the image forming processing on the sheet S. The maintenance processing on the head unit 51 includes cap processing, the purge processing, and wiping processing.

<Cap Processing>

Figure 5:
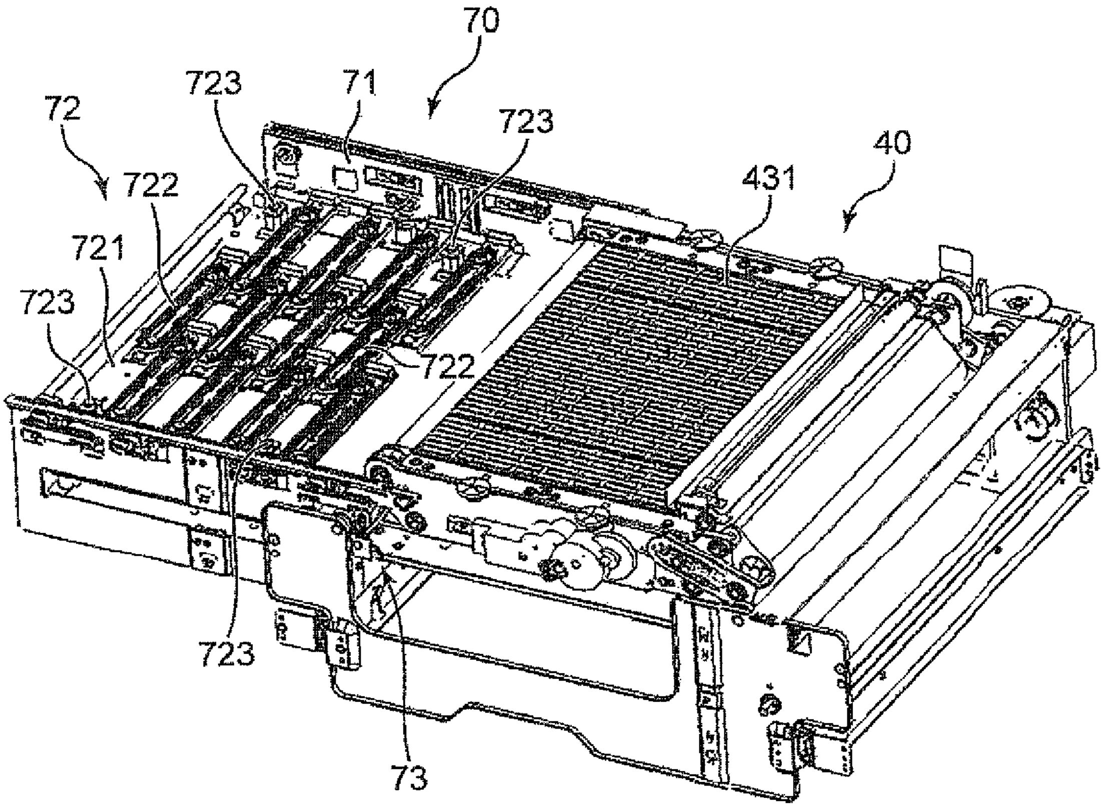
FIG. 5 is a perspective view illustrating a state in which a maintenance unit included in an inkjet recording apparatus is disposed at a retracted position.

The cap processing is for capping the head unit 51. The maintenance controller 92 mainly controls the transport lifting mechanism 63, the carriage moving mechanism 64, and the cap lifting mechanism 65 to perform the cap processing. This cap processing will be described with reference to FIGS. 5 to 8. The carriage moving mechanism 64 moves the carriage 71 in the maintenance unit 70 to move the cap unit 72 between a retracted position (see FIG. 5) retracted in the horizontal direction (left-right direction) with respect to the image forming unit 50 and a maintenance position (see FIG. 7) vertically below the image forming unit 50. Before the cap unit 72 is moved from the retracted position to the maintenance position, the transport lifting mechanism 63 lowers the sheet transport unit 40 vertically downward from a position immediately below the image forming unit 50 (see FIG. 6).

The cap unit 72 includes a cap tray 721 made of sheet metal, twelve cap portions 722 that are each in a recessed shape and disposed on an upper surface of the cap tray 721, and four positioning protrusions 723. The cap portions 722 are disposed on the cap tray 721, corresponding to the head units 51 disposed in a staggered manner for each of the colors Y, M, C, and Bk. The cap unit 72 is raised vertically upward by the cap lifting mechanism 65 when being disposed at the maintenance position illustrated in FIG. 7 (see FIG. 8), and then each cap portion 722 caps the liquid discharge surface 51A of the head unit 51. The positioning protrusion 723 comes into contact with the head housing 52 that holds the head unit 51 when the cap lifting mechanism 65 raises the cap unit 72, thereby keeping a contact state between the cap portion 722 and the liquid discharge surface 51A constant.

<Purge Processing and Wiping Processing>

The purge processing is for forcibly ejecting pressurized ink from the ink discharge nozzle 511 to remove air bubbles and foreign matters, thickened ink, and the like in the ink discharge nozzle 511 of the head unit 51. The wiping processing is for wiping off ink droplets adhering to the liquid discharge surface 51A of the head unit 51 after the purge processing. The purge processing and the wiping process will be described with reference to FIGS. 5, 6, and 9 to 11.

The carriage moving mechanism 64 moves the carriage 71 to move the wipe unit 73 between a retracted position (see FIG. 5) retracted in the horizontal direction with respect to the image forming unit 50 and a maintenance position (see FIG. 9) vertically below the image forming unit 50. When the wipe unit 73 is moved from the retracted position to the maintenance position, the cap unit 72 supported above the wipe unit 73 remains disposed at the retracted position. When the wipe unit 73 is moved from the retracted position to the maintenance position, the transport lifting mechanism

Figure 6:
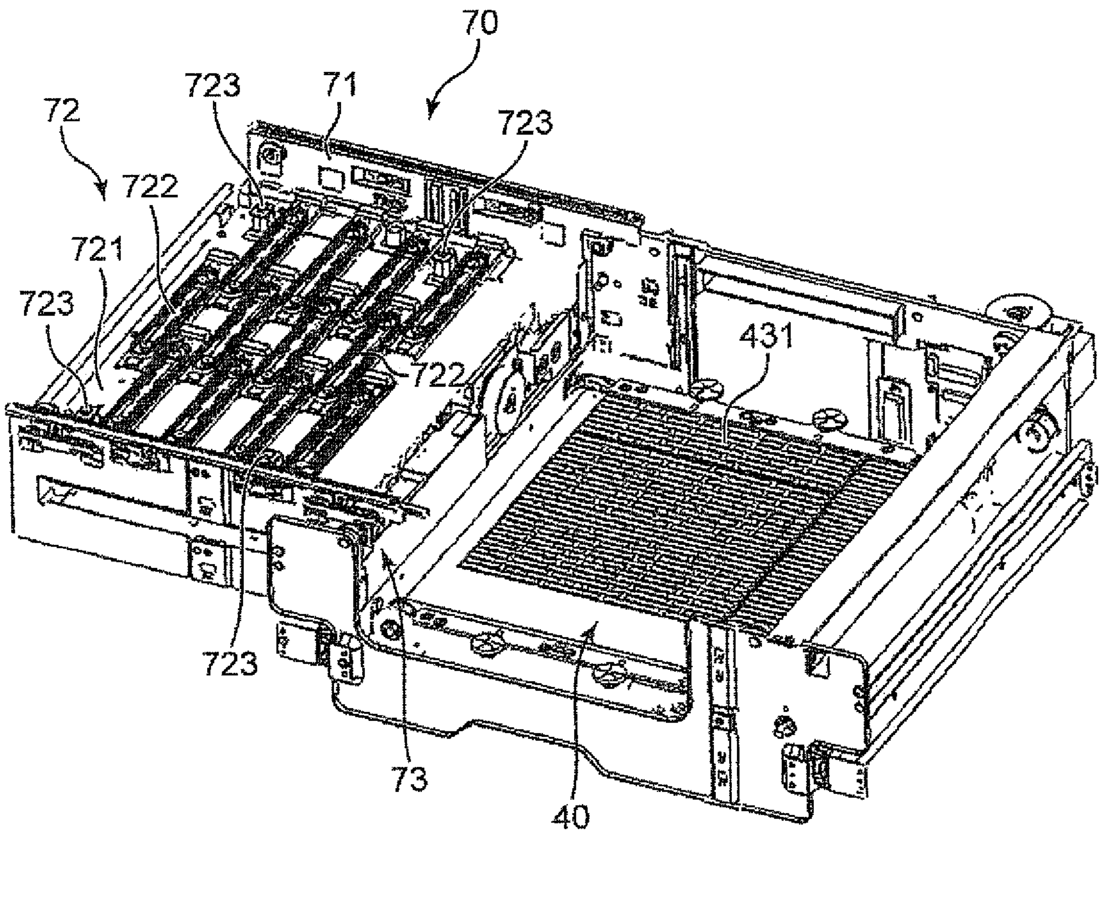
FIG. 6 is a perspective view illustrating a state in which a sheet transport unit included in an inkjet recording apparatus is lowered.
Figure 7:
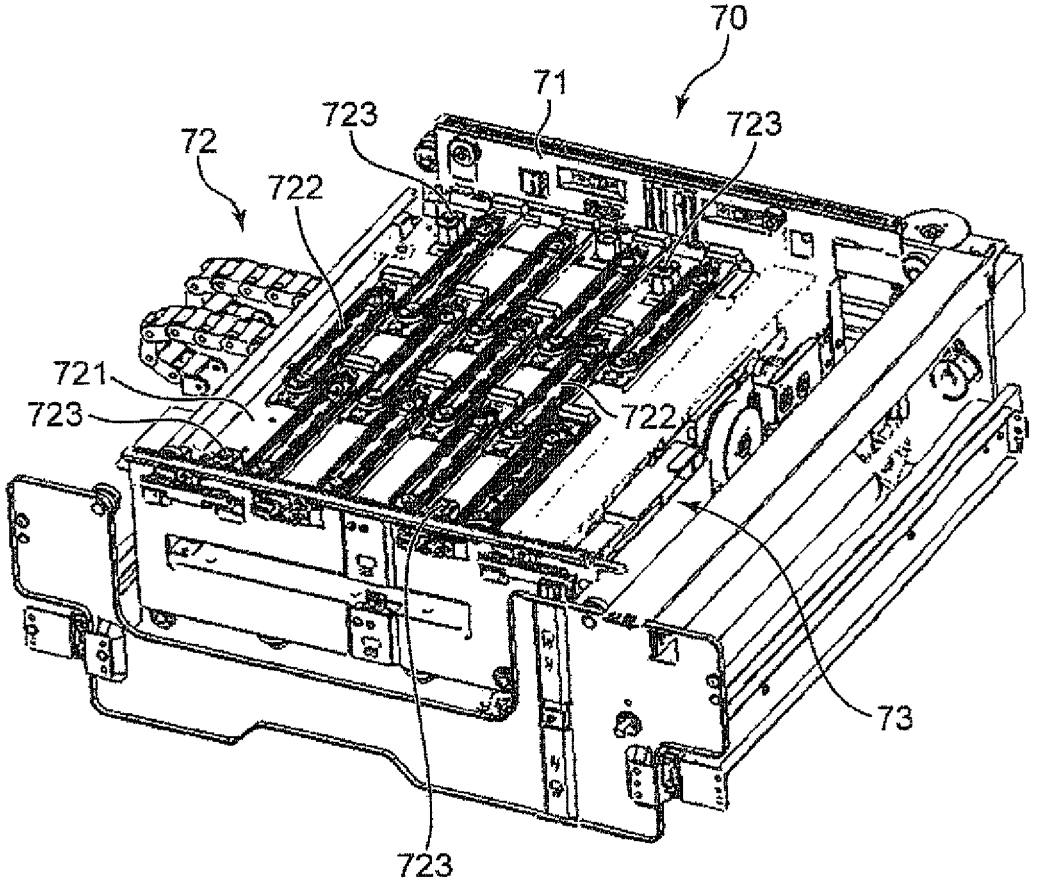
FIG. 7 is a perspective view illustrating a state in which a maintenance unit is disposed at a maintenance position.
Figure 8:
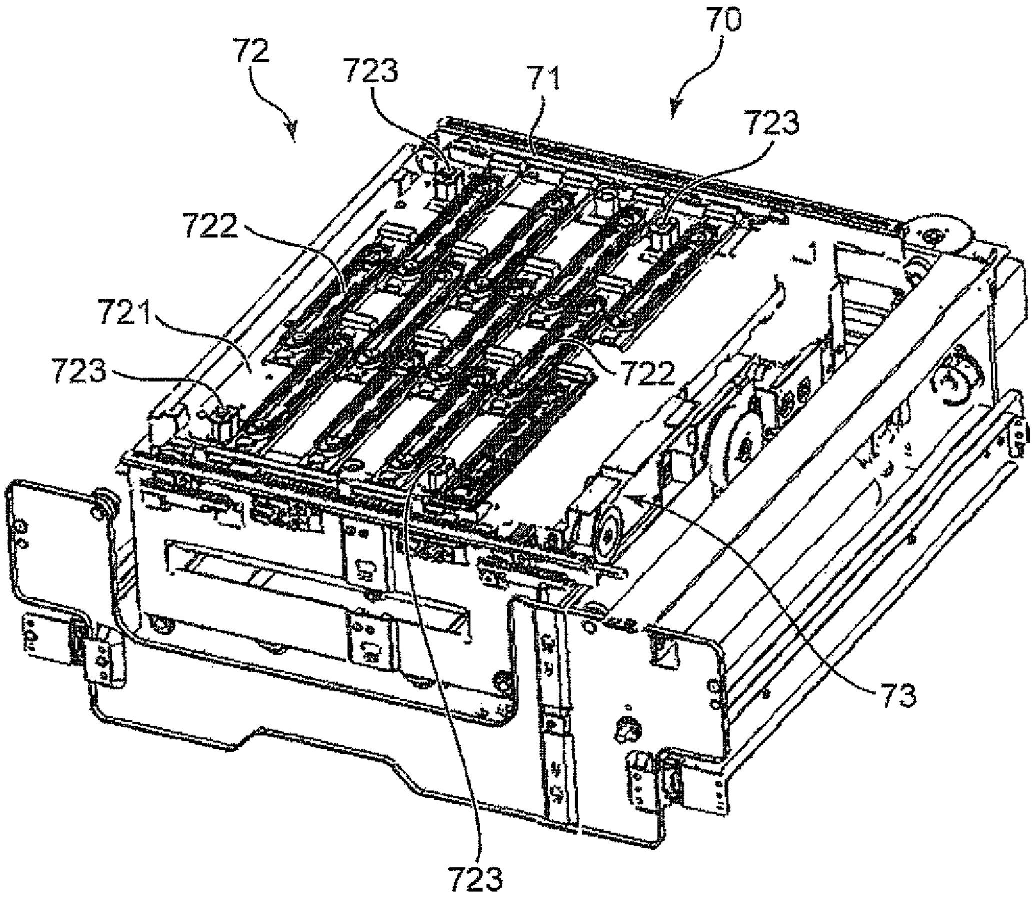
FIG. 8 is a perspective view illustrating a state in which a cap unit of a maintenance unit is raised.

63 lowers the sheet transport unit 40 vertically downward from a position immediately below the image forming unit 50 (see FIG. 6).

Figure 9:
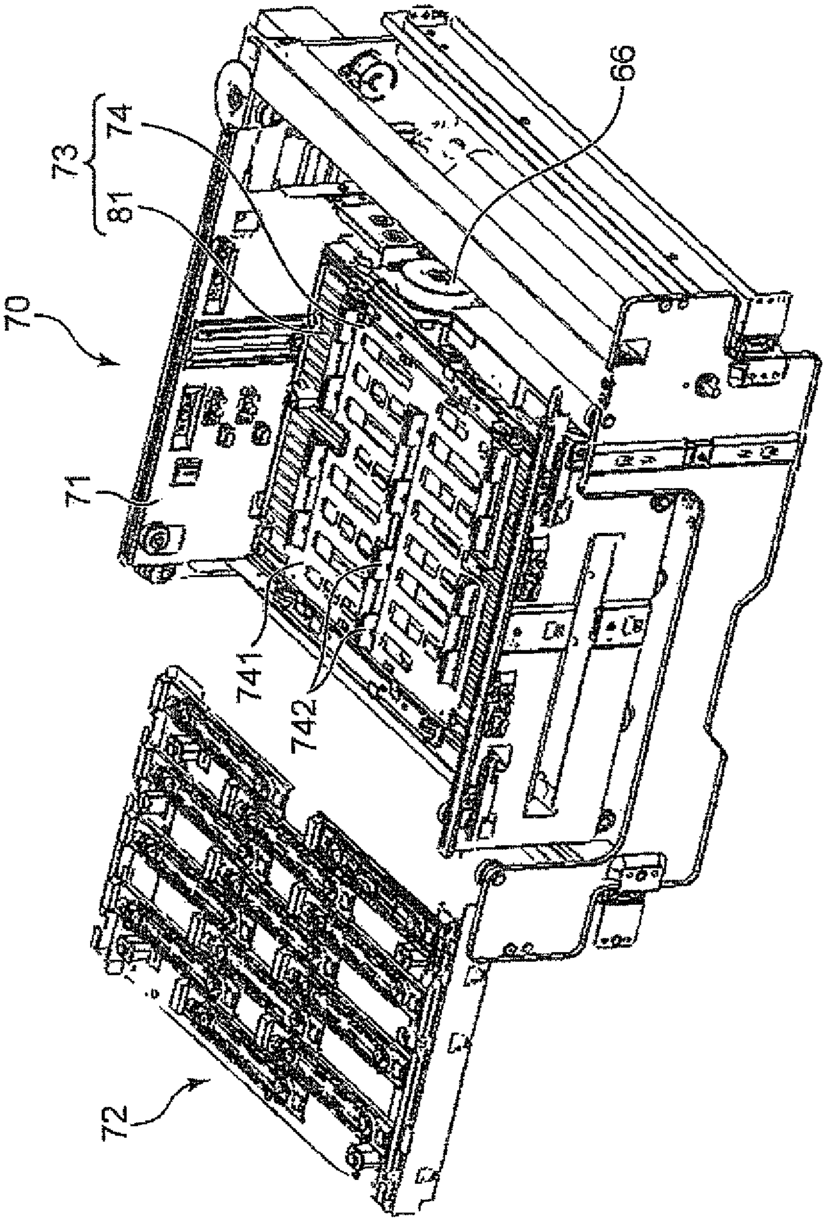
FIG. 9 is a perspective view illustrating a state in which a cap unit is disposed at a retracted position and a wipe unit is disposed at a maintenance position in a maintenance unit.
Figure 10:
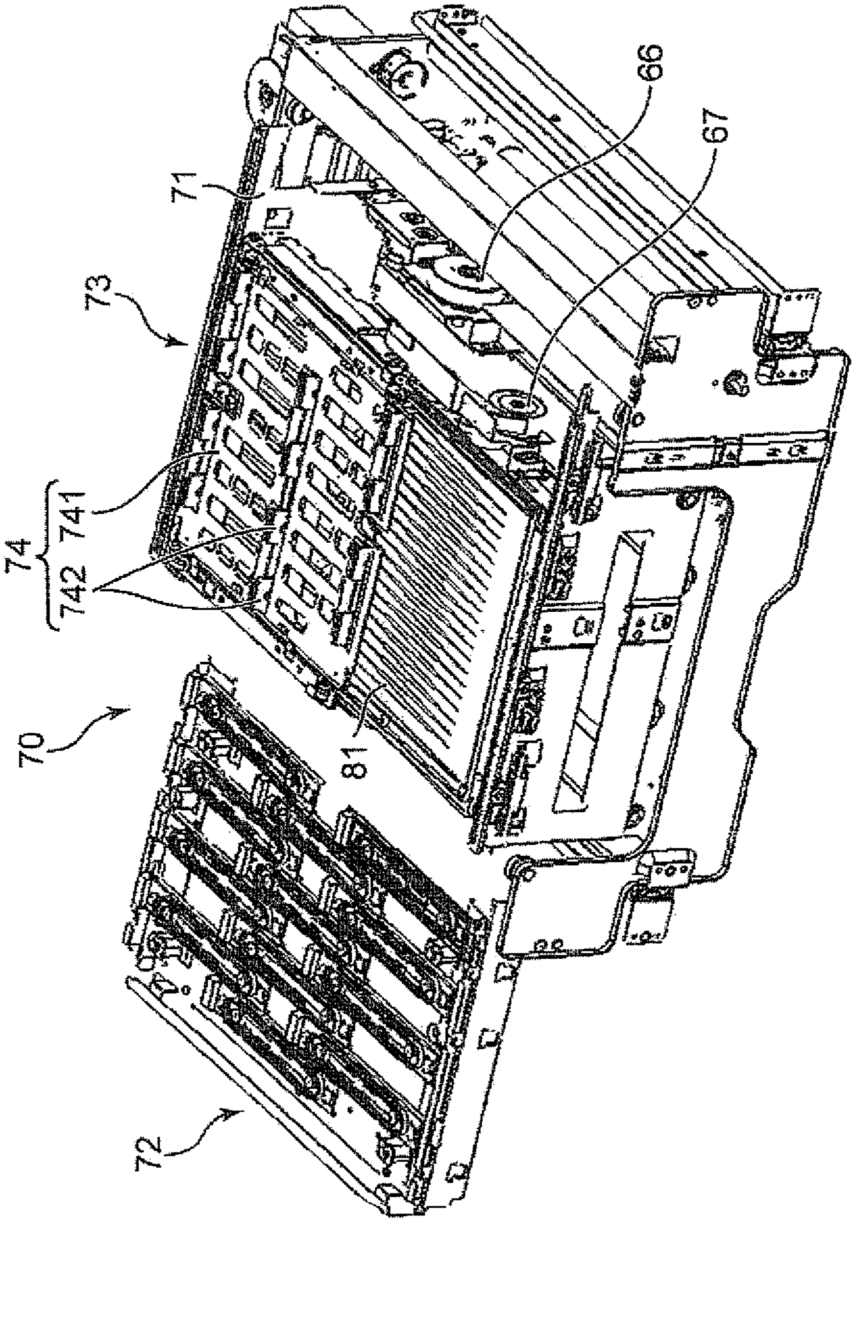
FIG. 10 is a perspective view illustrating a state in which a wipe unit is raised.
Figure 11:
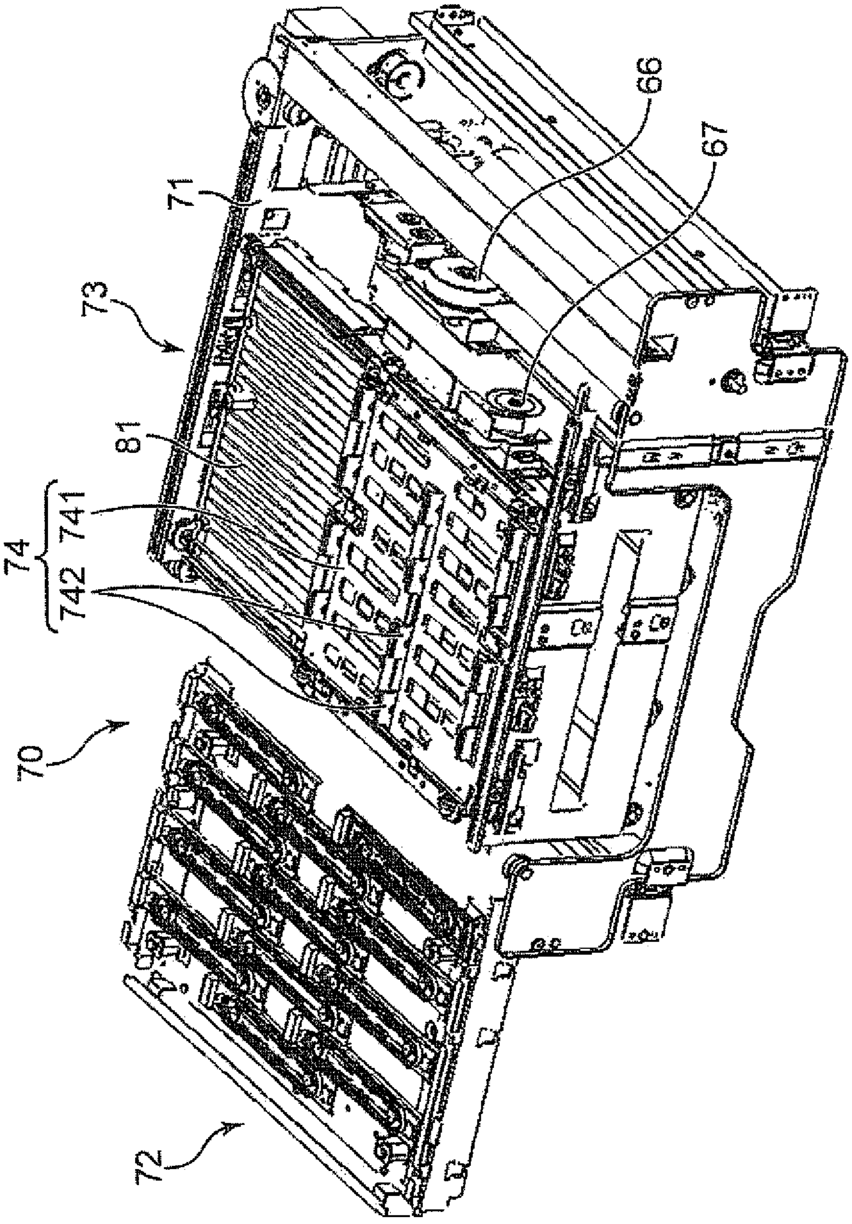
FIG. 11 is a perspective view illustrating a state in which a blade unit of a wipe unit performs wiping operation.

The wipe unit 73 is raised vertically upward by the wipe lifting mechanism 66 while being disposed at the maintenance position illustrated in FIG. 9 (see FIG. 10). After that, the maintenance controller 92 controls the purge mechanism 60 to perform the purge processing on the head unit 51. The maintenance controller 92 controls the blade moving mechanism 67 to move a blade unit 74 of the wipe unit 73 (see FIG. 11), and performs the wiping processing on the head unit 51.

Figure 4:
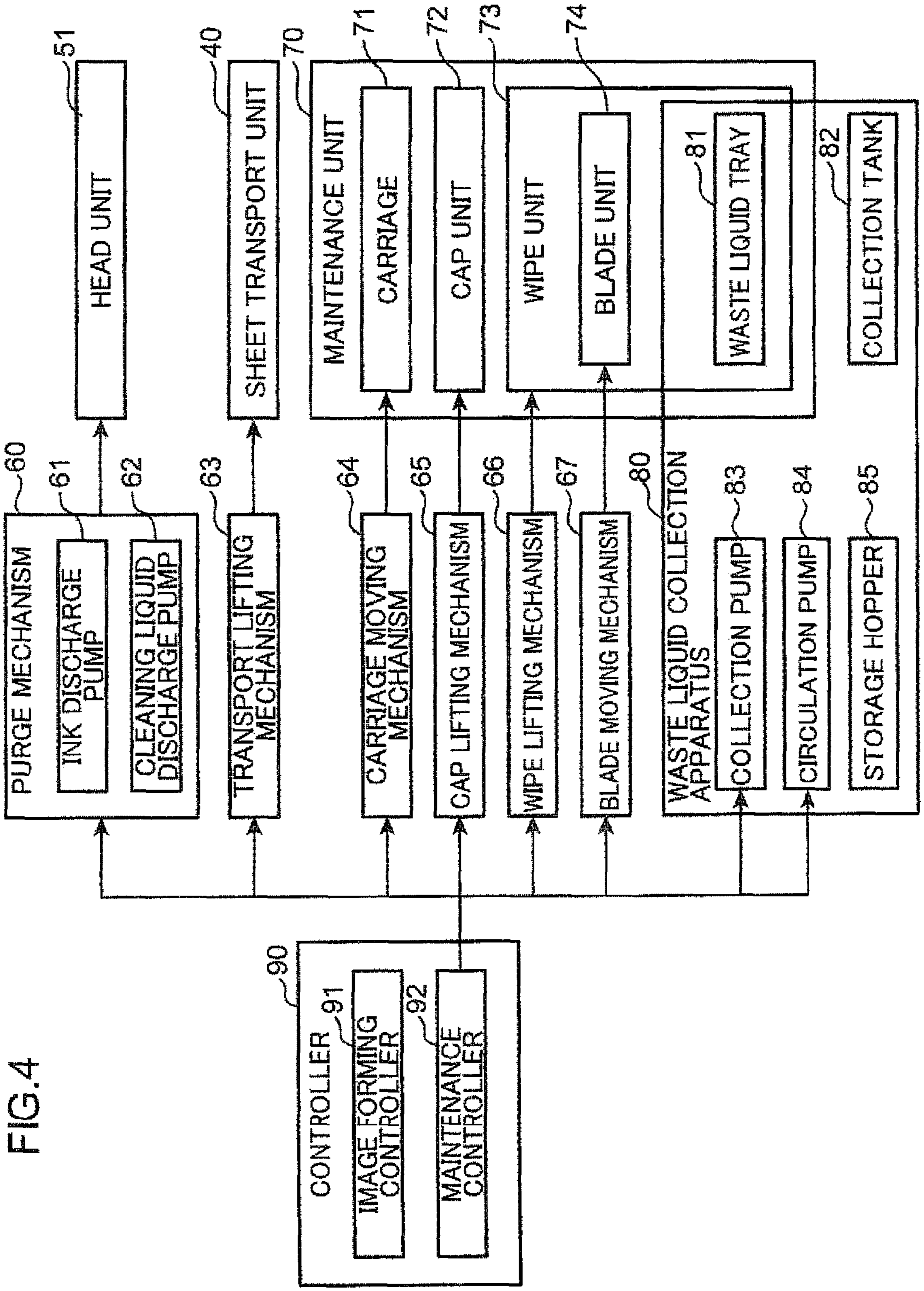
FIG. 4 is a block diagram illustrating a control system of an inkjet recording apparatus.

As illustrated in FIG. 4, the purge mechanism 60 includes an ink discharge pump 61 and a cleaning liquid discharge pump 62. The purge mechanism 60 operates the ink discharge pump 61 to perform an ink purge operation of discharging pressurized ink from each ink discharge nozzle 511 of the head unit 51. The ink purge operation enables removing bubbles, foreign matters, thickened ink, and the like in the ink discharge nozzle 511.

The purge mechanism 60 operates the cleaning liquid discharge pump 62 to perform a cleaning liquid purge operation of discharging a pressurized cleaning liquid from the cleaning liquid discharge nozzle 512 of the head unit 51. The cleaning liquid purge operation enables not only removing ink and the like having adhered to a waste liquid tray 81 and a wiper blade 742 described later, but also forming a coating layer of the cleaning liquid on the waste liquid tray 81 and the wiper blade 742. The coating layer of the cleaning liquid has a function of reducing surface tension of ink on the waste liquid tray 81 and the wiper blade 742. This enables suppressing a decrease in fluidity of the ink on the waste liquid tray 81 and the wiper blade 742, and effectively removing the ink having adhered, even when the ink dries and thickens as time elapses. The coating layer of the cleaning liquid formed on the wiper blade 742 reduces friction generated between the wiper blade 742 and the liquid discharge surface 51A when the wiper blade 742 is moved to wipe the ink while being in contact with the liquid discharge surface 51A of the head unit 51, and improves performance of wiping the ink.

The wipe unit 73 includes the blade unit 74 and the waste liquid tray 81. The waste liquid tray 81 constitutes a part of the waste liquid collection apparatus 80 described later. The blade unit 74 includes a wiper carriage 741 and a wiper blade 742. The wiper carriage 741 is a portion that holds the wiper blade 742, and is provided to be movable in the front-rear direction while holding the wiper blade 742. The wiper carriage 741 is moved in the front-rear direction by the blade moving mechanism 67 so that the wiper blade 742 moves along the head unit 51 in a state where the wipe unit 73 is disposed at a position (see FIG. 10) raised vertically upward from the maintenance position and immediately below the head unit 51 of the image forming unit 50. In other words, the blade moving mechanism 67 moves the wiper carriage 741 of the blade unit 74 in the front-rear direction to move the wiper blade 742 together with the wiper carriage 741 in the front-rear direction along the head unit 51.

The wiper blade 742 is provided corresponding to each of the head units 51 disposed in a staggered manner for the corresponding one of colors Y, M, C, and Bk. After the purge processing of the ink purge operation and the cleaning liquid purge operation using the purge mechanism 60, the wiper blade 742 performs wiping operation of wiping off droplets having adhered to the liquid discharge surface 51A of the head unit 51. The wiper blade 742 is, for example, an elastic member made of rubber composed of EPDM. Mobile operation of the wiper carriage 741 using the blade moving mechanism 67 causes the wiper blade 742 to move from a first end edge 51AA on a cleaning liquid discharge region 512A side in the liquid discharge surface 51A toward a second end edge 51AB on an ink discharge region 511A side therein while the wiper blade 742 is in contact with the liquid discharge surface 51A. This allows the wiper blade 742 to perform a wiping operation of wiping off droplets having adhered to the liquid discharge surface 51A of the head unit 51.

Figure 12:
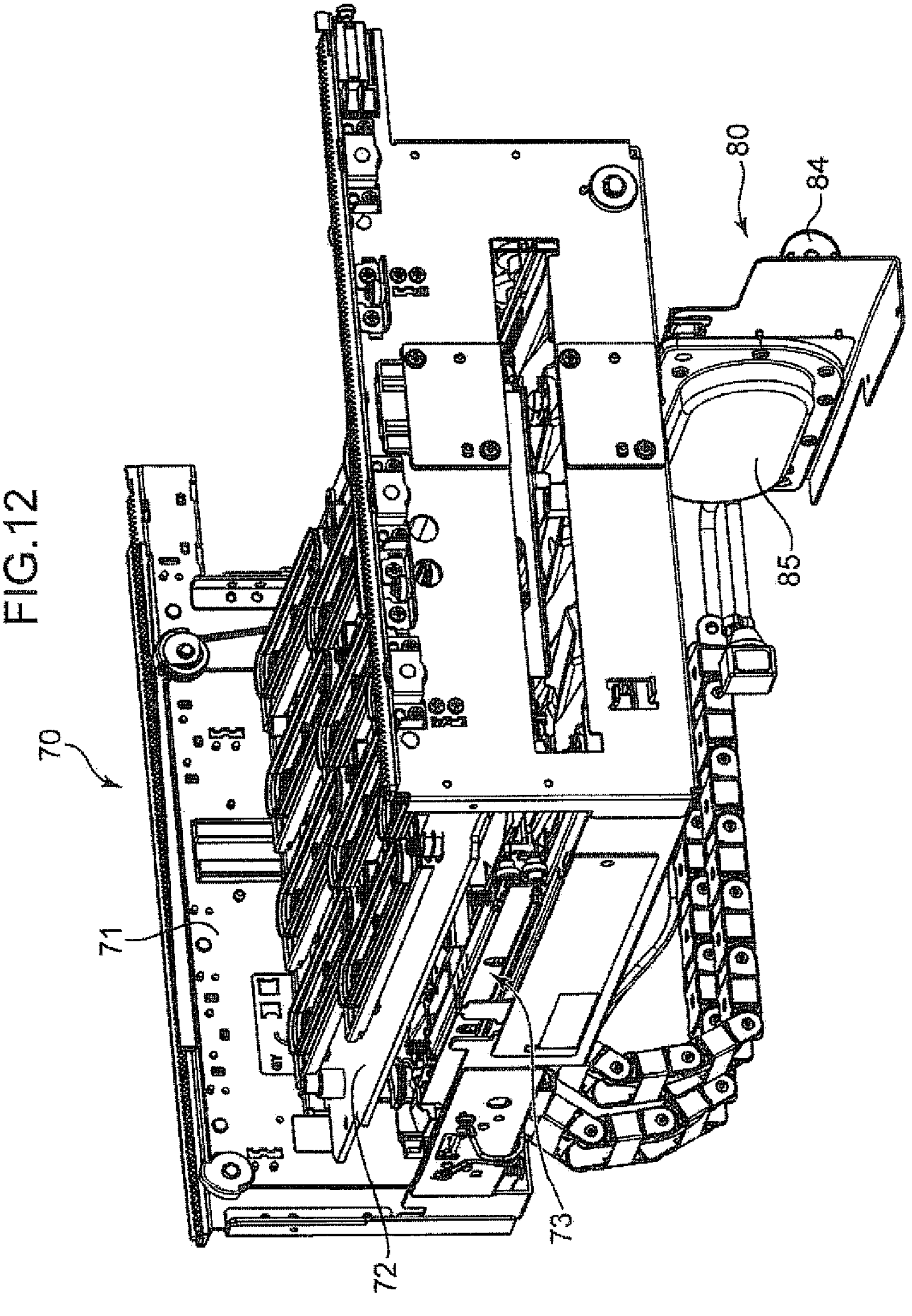
FIG. 12 is a perspective view illustrating a waste liquid collection apparatus installed near a maintenance unit.

When the purge processing is performed in the head unit 51, ink discharged from the ink discharge nozzle 511 and a cleaning liquid discharged from the cleaning liquid discharge nozzle 512 as necessary are each collected as a waste liquid by the waste liquid collection apparatus 80. The wiping operation of the wiper blade 742 in the wiping processing causes a liquid to drop along the wiper blade 742, the liquid being also collected as a waste liquid by the waste liquid collection apparatus 80. The maintenance controller 92 also controls the waste liquid collection apparatus 80. As illustrated in FIG. 12, the waste liquid collection apparatus 80 is provided near the maintenance unit 70.

[Configuration of Waste Liquid Collection Apparatus]

Figure 13:
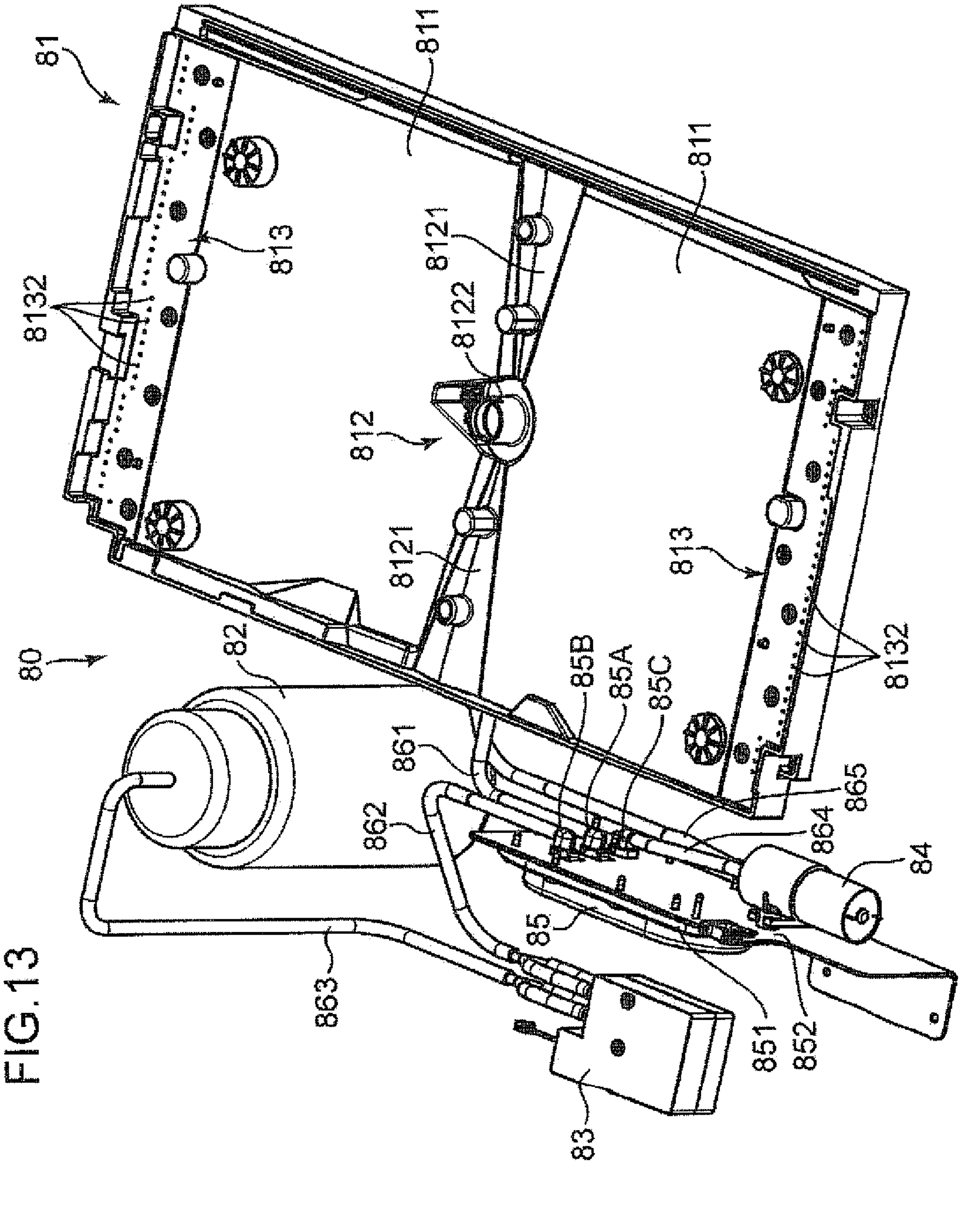
FIG. 13 is a perspective view of a waste liquid collection apparatus as viewed obliquely from above.
Figure 14:
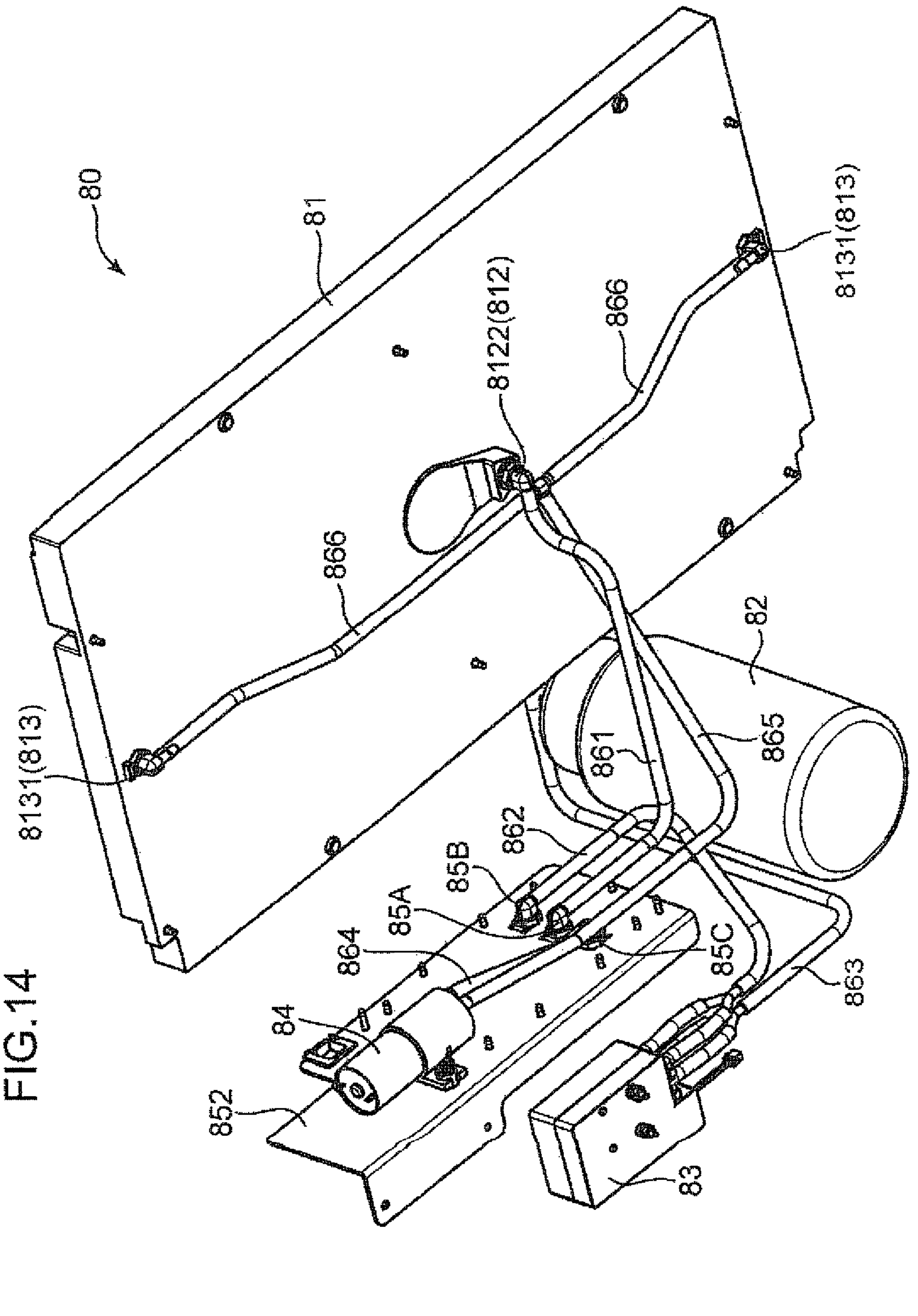
FIG. 14 is a perspective view of a waste liquid collection apparatus as viewed obliquely from below.
Figure 15:
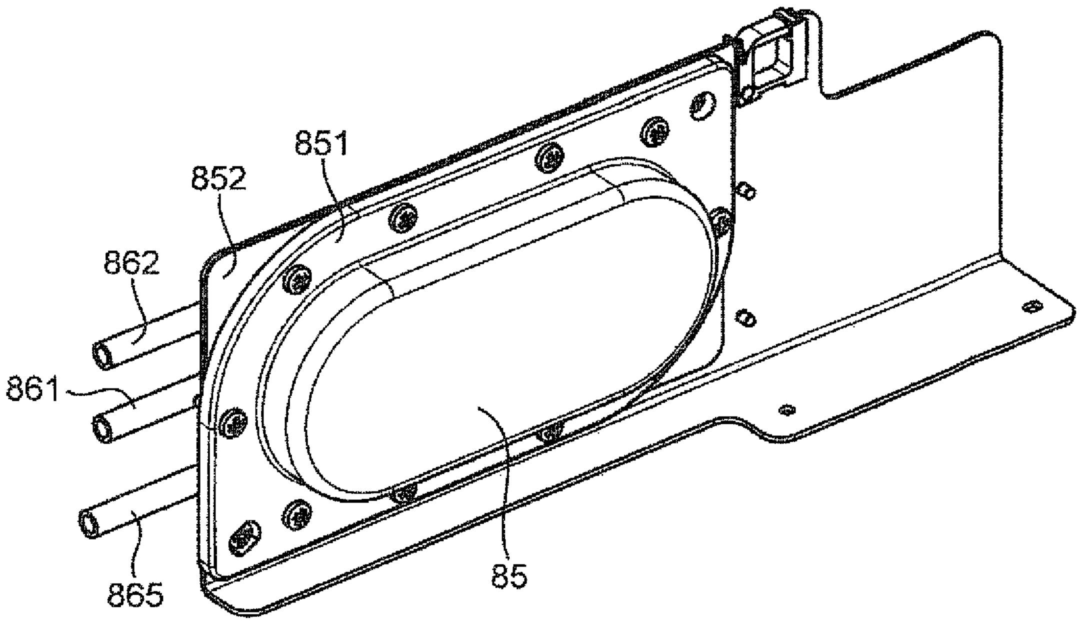
FIG. 15 is an enlarged perspective view illustrating the vicinity of a storage hopper of a waste liquid collection apparatus.
Figure 16:
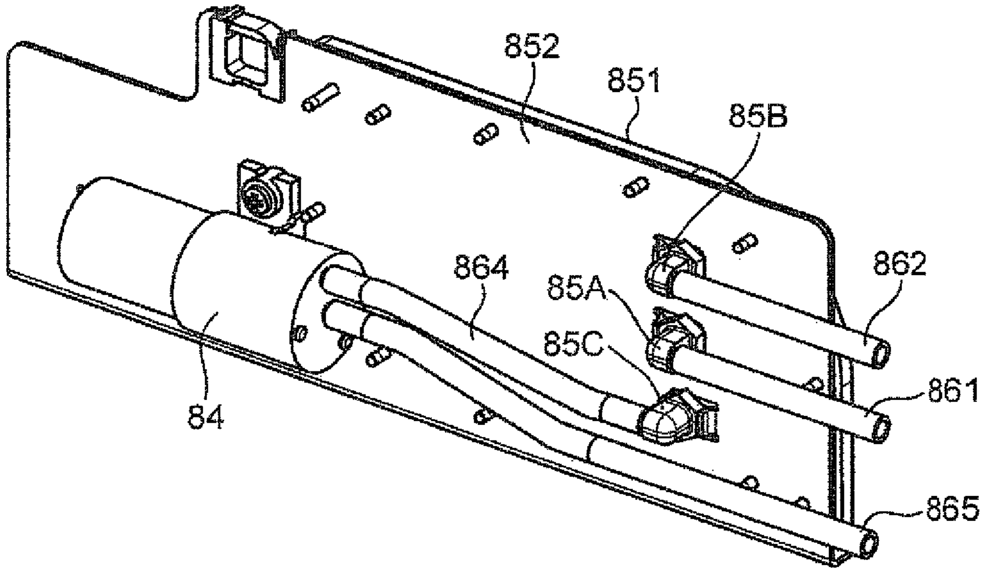
FIG. 16 is an enlarged perspective view of the vicinity of a circulation pump of a waste liquid collection apparatus.
Figure 17:
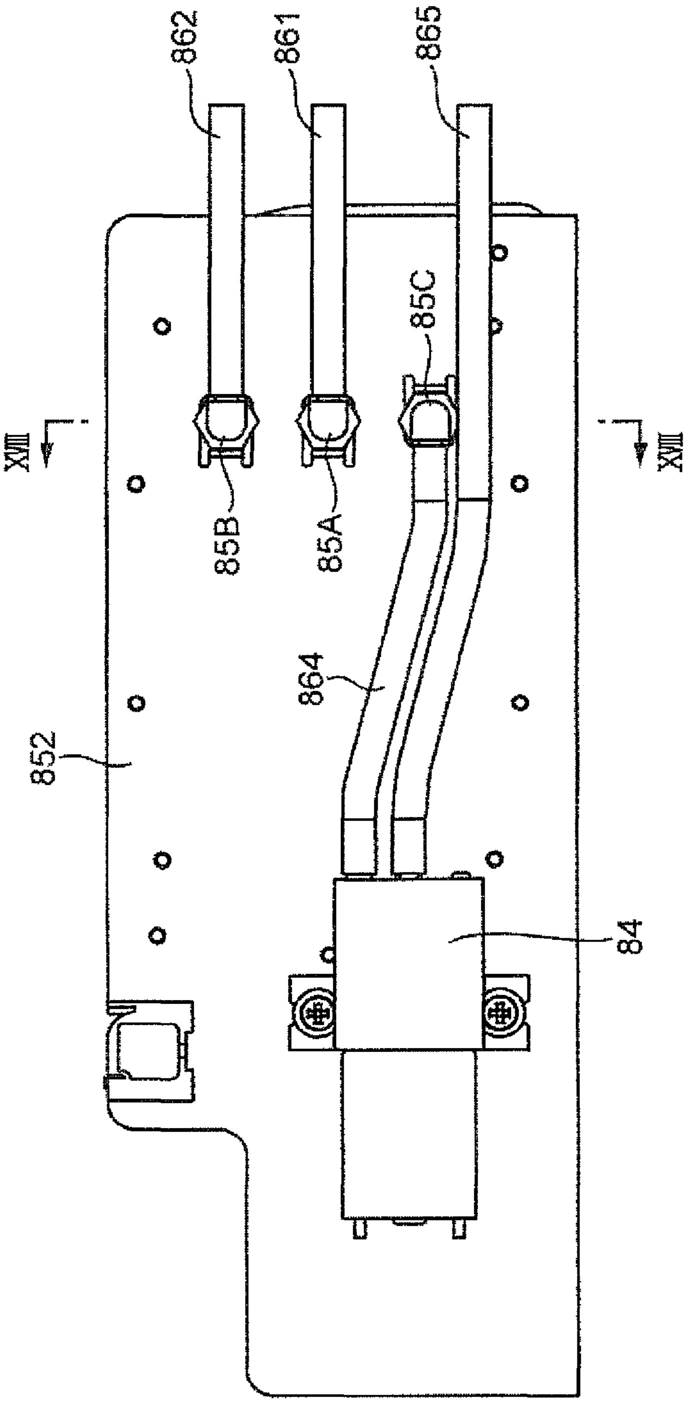
FIG. 17 is a plan view of the vicinity of a circulation pump.
Figure 18:
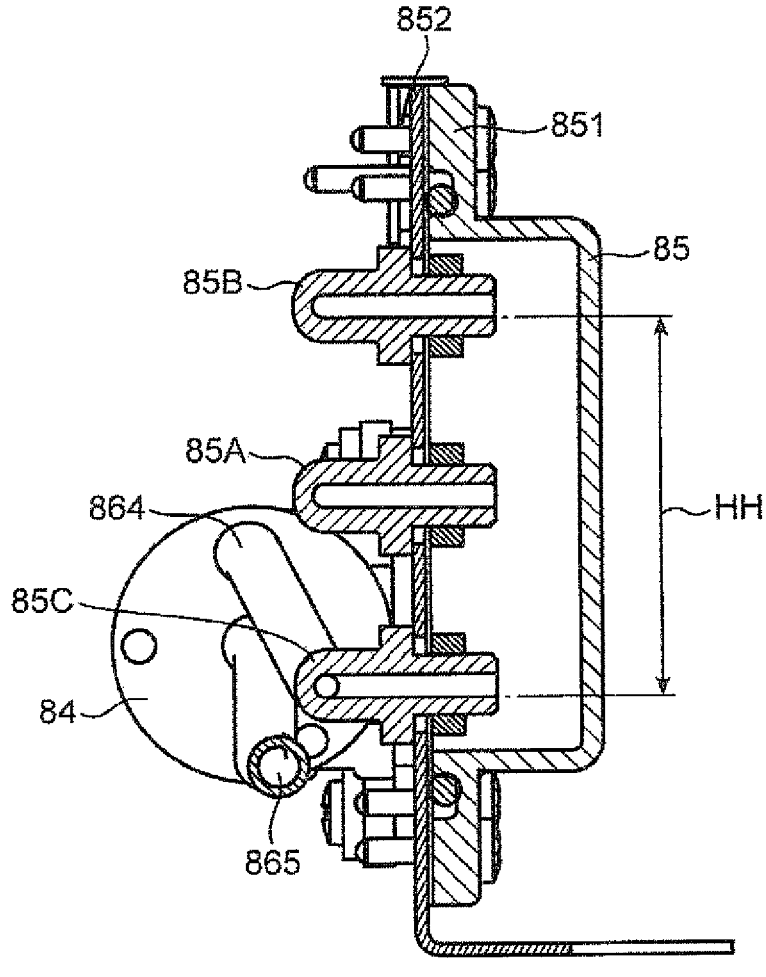
FIG. 18 is a sectional view taken along line XVIII-XVIII in FIG. 17.

The waste liquid collection apparatus 80 included in the inkjet recording apparatus 1 will be described with reference to FIGS. 13 to 18 in addition to FIGS. 4 and 12. FIGS. 13 and 14 are each a perspective view of the waste liquid collection apparatus 80. FIG. 13 is a diagram viewed obliquely from above and FIG. 14 is a diagram viewed obliquely from below. FIG. 15 is an enlarged perspective view illustrating the vicinity of a storage hopper 85 of the waste liquid collection apparatus 80. FIGS. 16 and 17 are each a diagram illustrating the vicinity of a circulation pump 84 of the waste liquid collection apparatus 80. FIG. 16 is a perspective view and FIG. 17 is a plan view. FIG. 18 is a sectional view taken along line XVIII-XVIII in FIG. 17.

The waste liquid collection apparatus 80 is a device that collects liquids (ink, a cleaning liquid) discharged from the head unit 51 as waste liquids in the maintenance processing for the head unit 51. The waste liquid collection apparatus 80 includes the waste liquid tray 81 constituting a part of the wipe unit 73, a collection tank 82, a collection pump 83, the circulation pump 84, and the storage hopper 85.

When the wipe unit 73 is disposed immediately below the head unit 51, the waste liquid tray 81 is disposed below the wiper blade 742, i.e., below the blade unit 74, while facing the liquid discharge surface 51A of the head unit 51. The waste liquid tray 81 has a predetermined width in the left-right direction and extends in the front-rear direction. The waste liquid tray 81 includes a waste liquid receiving surface 811, a waste liquid discharge part 812, and a waste liquid supply part 813.

The waste liquid receiving surface 811 is a portion that receives a liquid (a waste liquid) discharged from the head unit 51, and constitutes a waste liquid flow path through which the waste liquid flows. In the present embodiment, as illustrated in FIG. 13, waste liquid receiving surfaces 811 are disposed on respective sides in the front-rear direction across the waste liquid discharge part 812 disposed in a substantially central portion of the waste liquid tray 81. Each of the waste liquid receiving surfaces 811 is inclined downward toward the waste liquid discharge part 812 to allow the waste liquid to flow from an upper end of each of the waste liquid receiving surfaces 811 to a lower end thereof. That is, the waste liquid receiving surfaces 811 are each an inclined surface that is inclined downward toward the waste liquid discharge part 812. The head unit 51 discharges a waste liquid that flows toward the waste liquid discharge part 812 along inclination of each of the waste liquid receiving surfaces 811, and that is discharged from the waste liquid discharge part 812.

The waste liquid discharge part 812 is disposed at a substantially central portion of the waste liquid tray 81 while being adjacent to the lower end of each of the waste liquid receiving surfaces 811, and discharges a waste liquid having flowed along each of the waste liquid receiving surfaces 811. The waste liquid discharge part 812 includes a waste liquid merging portion 8121 where the waste liquid having flowed along each of the waste liquid receiving surfaces 811 is merged, and a discharge port portion 8122 where the waste liquid merged in the waste liquid merging portion 8121 is discharged. The waste liquid having flowed along each of the waste liquid receiving surfaces 811 to reach the waste liquid discharge part 812 is merged by the waste liquid merging portion 8121 and discharged from the discharge port portion 8122.

The waste liquid supply part 813 is disposed at an end portion of the waste liquid tray 81 in the front-rear direction and is adjacent to the upper end of the corresponding one of the waste liquid receiving surfaces 811, and supplies the waste liquid fed by the circulation pump 84 described later to the upper end of the corresponding one of the waste liquid receiving surfaces 811. The waste liquid supply part 813 includes a waste liquid inflow part 8131 into which the waste liquid fed by the circulation pump 84 flows, and a waste liquid supply hole 8132 for supplying the waste liquid having flowed into the waste liquid inflow part 8131 to the upper end of the corresponding one of the waste liquid receiving surfaces 811. The waste liquid fed by the circulation pump 84 to reach the waste liquid supply part 813 is allowed to flow into the waste liquid inflow part 8131 to be supplied to the upper end of the corresponding one of the waste liquid receiving surfaces 811 through the waste liquid supply hole 8132. As illustrated in FIG. 13, a plurality of the waste liquid supply holes 8132 is arranged in the left-right direction along the upper end of the corresponding one of the waste liquid receiving surfaces 811. The waste liquid supplied to the upper end of the corresponding one of the waste liquid receiving surfaces 811 through the waste liquid supply holes 8132 flows toward the waste liquid discharge part 812 along inclination of the corresponding one of the waste liquid receiving surfaces 811.

The collection tank 82 collects the waste liquid discharged from the waste liquid discharge part 812 and fed by the collection pump 83. In other words, the collection pump 83 performs waste liquid collection processing of feeding a part of the waste liquid discharged from the waste liquid discharge part 812 to the collection tank 82. Although the collection pump 83 may have a small flow rate of waste liquid fed to the collection tank 82 per unit time, it is desired that the collection pump 83 is less likely to break down. This is because when the collection pump 83 breaks down, the waste liquid cannot be fed to the collection tank 82, and thus the waste liquid may overflow from the waste liquid tray 81.

In the present embodiment, the collection pump 83 is composed of a tube pump. The tube pump includes a roller or the like that is moved while squeezing a tube with elasticity to push out a liquid (a waste liquid) in the tube. The tube pump is configured such that after the roller or the like is moved, a squeezed portion of the tube returns to an original shape due to restoring force of the tube. At this time, a pressure reducing space is generated in the tube, so that the waste liquid can be sucked. The tube pump implements a pump function of sucking and feeding the waste liquid by continuously performing this operation.

The circulation pump 84 performs waste liquid circulation processing of returning another part of the waste liquids discharged from the waste liquid discharge part 812 to the upper end of the corresponding one of the waste liquid receiving surfaces 811 and circulating the other part of the waste liquids. The circulation pump 84 desirably has a larger flow rate of waste liquid per unit time, fed to the upper end of the corresponding one of the waste liquid receiving surfaces 811, than the collection pump 83. In the present embodiment, the circulation pump 84 is composed of a diaphragm pump. The diaphragm pump is configured to transfer a liquid (a waste liquid) by combining a reciprocating motion of a diaphragm in a chamber and a suitable check valve. The diaphragm pump is configured such that pressure decreases when the chamber increases in volume due to movement of the diaphragm, and then the waste liquid flows into the chamber. Next, when the pressure in the chamber increases due to the movement of the diaphragm, the waste liquid having inflowed is forcibly fed. The diaphragm pump implements a pump function of sucking and feeding the waste liquid by continuously performing this operation.

The storage hopper 85 temporarily stores all the waste liquid discharged from the waste liquid discharge part 812. As illustrated in FIGS. 15 and 16, the storage hopper 85 includes a first plate 851 having a recessed portion and a second plate 852 having a flat plate portion, which are combined with each other. Specifically, the first plate 851 and the second plate 852 are joined sealing the recessed portion of the first plate 851 with the flat plate portion of the second plate 852, and the storage hopper 85 includes a space surrounded by the recessed portion and the flat plate portion.

The storage hopper 85 includes a hopper inflow part 85A, a first hopper outflow part 85B, and a second hopper outflow part 85C. The hopper inflow part 85A is connected to the waste liquid discharge part 812 using a first pipe 861. The hopper inflow part 85A is configured to allow the waste liquid discharged from the waste liquid discharge part 812 and having flowed through the first pipe 861 to flow into the storage hopper 85.

The first hopper outflow part 85B is connected to a suction unit of the collection pump 83 using a second pipe 862. The first hopper outflow part 85B is configured to allow the waste liquid in the storage hopper 85 to flow out to the collection pump 83. The collection pump 83 has a feeding part connected to the collection tank 82 using a third pipe 863. That is, the collection pump 83 is connected between the storage hopper 85 and the collection tank 82. When the collection pump 83 operates, the waste liquid having flowed along each of the waste liquid receiving surfaces 811 is discharged from the waste liquid discharge part 812, and flows into the storage hopper 85 from the hopper inflow part 85A through the first pipe 861. The waste liquid having flowed into the storage hopper 85 flows out from the first hopper outflow part 85B and is sucked by the collection pump 83 through the second pipe 862. The waste liquid sucked by the collection pump 83 is fed toward the collection tank 82 through the third pipe 863 and collected in the collection tank 82.

The second hopper outflow part 85C is connected to a suction unit of the circulation pump 84 using a fourth pipe 864. The second hopper outflow part 85C is configured to allow the waste liquid in the storage hopper 85 to flow out to the circulation pump 84. The circulation pump 84 has a feeding part connected to a fifth pipe 865, and a sixth pipe 866 connected to the fifth pipe 865 is connected to the waste liquid supply part 813. That is, the circulation pump 84 is connected between the storage hopper 85 and the waste liquid supply part 813. The circulation pump 84 is attached to the second plate 852 constituting the storage hopper 85. The circulation pump 84 feeds the waste liquid stored in the storage hopper 85 to the waste liquid supply part 813 to circulate the waste liquid between the storage hopper 85 and each of the waste liquid receiving surfaces 811.

When the circulation pump 84 operates, the waste liquid stored in the storage hopper 85 flows out from the second hopper outflow part 85C and is sucked by the circulation pump 84 through the fourth pipe 864. The waste liquid sucked by the circulation pump 84 is fed toward the waste liquid supply part 813 through the fifth pipe 865 and the sixth pipe 866, and is supplied from the waste liquid supply part 813 to the upper end of the corresponding one of the waste liquid receiving surfaces 811. When the waste liquid is supplied to the upper end of the corresponding one of the waste liquid receiving surfaces 811, the waste liquid flows toward the waste liquid discharge part 812 along the corresponding one of the waste liquid receiving surfaces 811.

The storage hopper 85 includes the hopper inflow part 85A, the first hopper outflow part 85B, and the second hopper outflow part 85C, which are arranged side by side in a vertical direction (up-down direction). Specifically, as illustrated in FIGS. 17 and 18, the first hopper outflow part 85B, the hopper inflow part 85A, and the second hopper outflow part 85C are arranged downward in this order in the vertical direction. That is, the first hopper outflow part 85B is disposed vertically above the hopper inflow part 85A, and the second hopper outflow part 85C is disposed vertically below the hopper inflow part 85A. This kind of structure allows the amount of waste liquid (amount of circulating waste liquid) circulated between the storage hopper 85 and the waste liquid receiving surfaces 811 by the circulation pump 84 to be defined by the amount of waste liquid stored in the storage hopper 85 within a range HH (FIG. 18) between the first hopper outflow part 85B and the second hopper outflow part 85C in the vertical direction. The amount of circulating waste liquid is set to be smaller than a maximum allowable amount to be able to receive the waste liquid in the waste liquid tray 81. This enables preventing the waste liquid from overflowing from the waste liquid tray 81.

The amount of waste liquid fed to the collection tank 82 by the collection pump 83 is defined by the amount of waste liquid stored in the storage hopper 85 within a range above the first hopper outflow part 85B.

As described above, the waste liquid collection apparatus 80 is configured such that the waste liquid discharged from the head unit 51 in the maintenance processing flows along the waste liquid receiving surfaces 811 of the waste liquid tray 81 and is discharged from the waste liquid discharge part 812. The waste liquid discharged from the waste liquid discharge part 812 is fed to the collection tank 82 by the collection pump 83 and collected in the collection tank 82.

Here, when the amount of waste liquid discharged from the head unit 51 is relatively small, the waste liquid may stagnate on each of the waste liquid receiving surfaces 811 without flowing to the waste liquid discharge part 812 depending on an inclination angle of each of the waste liquid receiving surfaces 811, and may dry and adhere. Thus, the waste liquid collection apparatus 80 includes the circulation pump 84. The circulation pump 84 returns the waste liquid discharged from the waste liquid discharge part 812 to the upper end of each of the waste liquid receiving surfaces 811 to circulate the waste liquid. This enables the amount of waste liquid flowing on each of the waste liquid receiving surfaces 811 to be apparently increased, so that the waste liquid can be prevented from stagnating on each of the waste liquid receiving surfaces 811 as much as possible. Thus, the waste liquid can be prevented from drying on each of the waste liquid receiving surfaces 811 and adhering in an aggregated state thereto, and thus can be appropriately collected.

[Waste Liquid Collection Processing and Waste Liquid Circulation Processing of Waste Liquid Collection Apparatus]

Figure 20A:
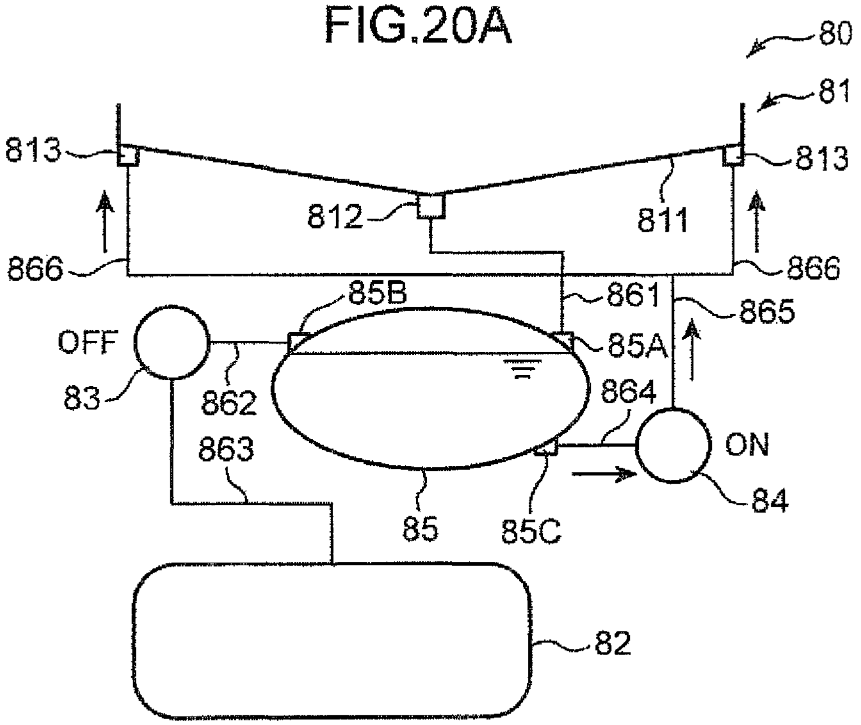
FIG. 20 is a diagram for illustrating a state in which a waste liquid collection apparatus performs waste liquid circulation processing.
Figure 20B:
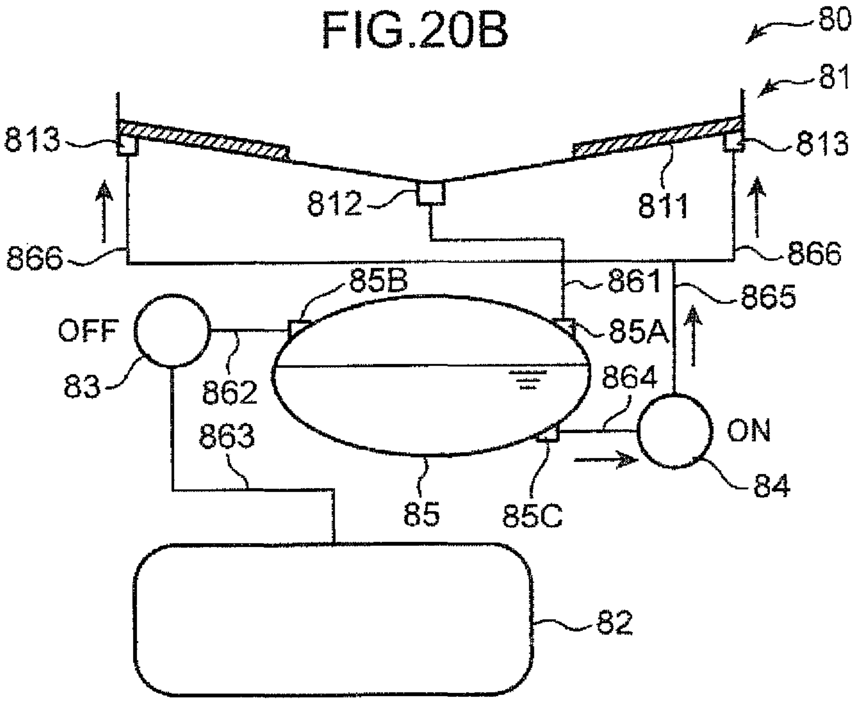
Figure 21A:
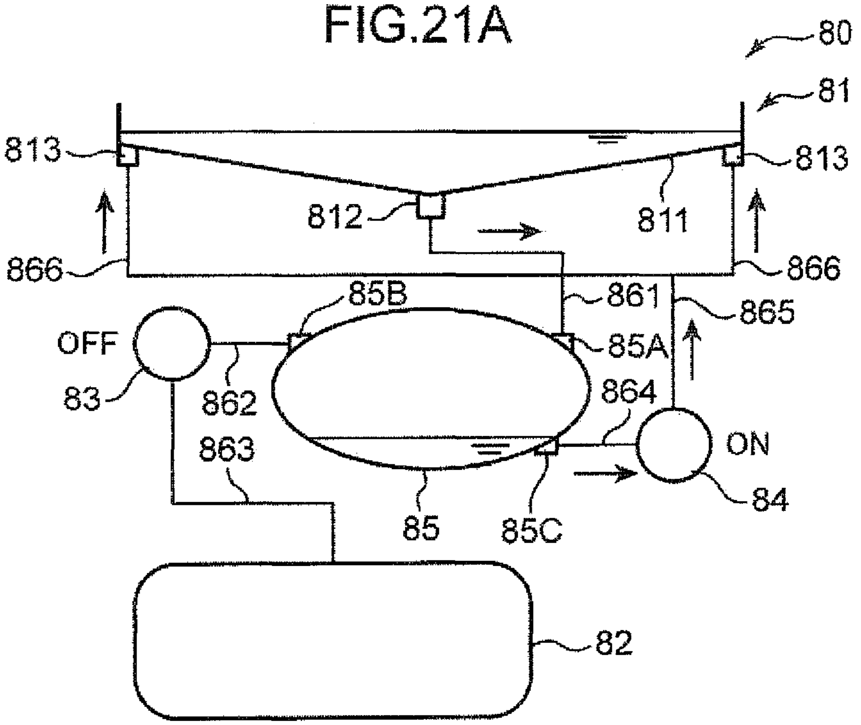
FIG. 21 is a diagram for illustrating a state in which a waste liquid collection apparatus performs waste liquid circulation processing.
Figure 21B:
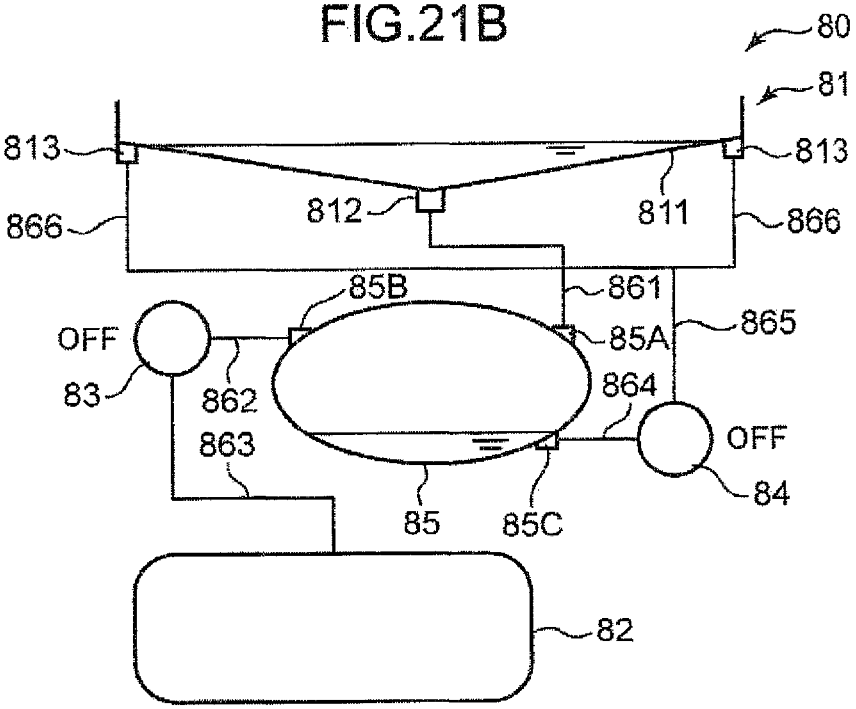

The waste liquid collection apparatus 80 is configured such that waste liquid collection processing performed by the collection pump 83 and waste liquid circulation processing performed by the circulation pump 84 are controlled by the maintenance controller 92. The waste liquid collection processing and the waste liquid circulation processing will be described with reference to FIGS. 19 to 22. FIG. 19 is a diagram for illustrating operation of the waste liquid collection apparatus 80 when the purge mechanism 60 performs purge processing. FIGS. 20 to 22 are each a diagram for illustrating a state in which the waste liquid collection apparatus 80 performs the waste liquid circulation processing. Although FIGS. 19 to 22 are different from FIGS. 16 to 18 in illustration in which the first hopper outflow part 85B and the hopper inflow part 85A are located at the same height, this is for simplification of illustration and is not intended otherwise. An essential height relationship between the first hopper outflow part 85B and the second hopper outflow part 85C is similar to that illustrated in FIGS. 16 to 18.

<Waste Liquid Collection Processing>

Figure 19A:
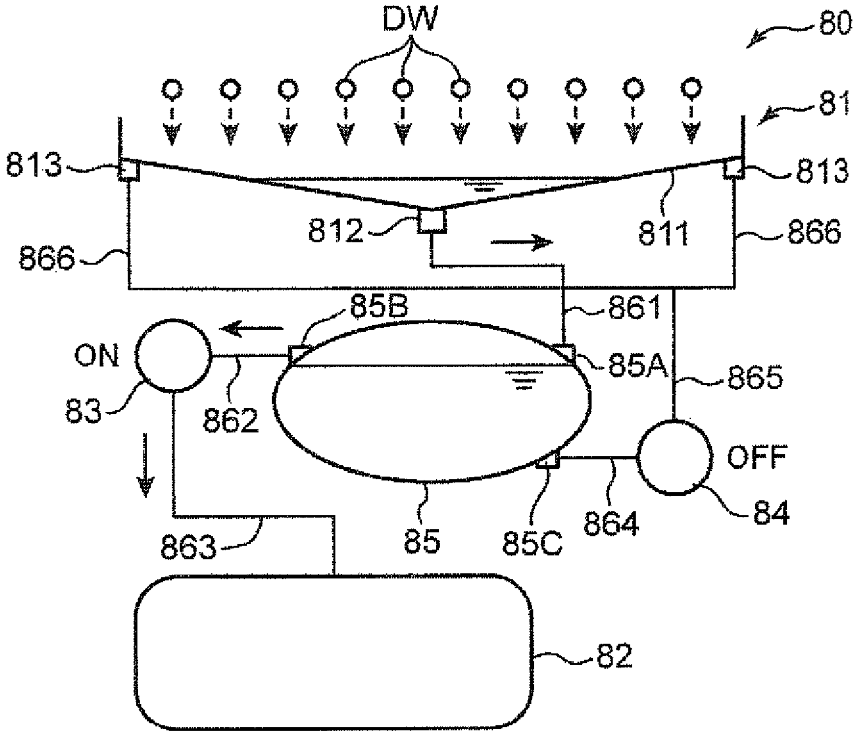
FIG. 19 is a diagram for illustrating operation of a waste liquid collection apparatus when a purge mechanism performs purge processing.
Figure 19B:
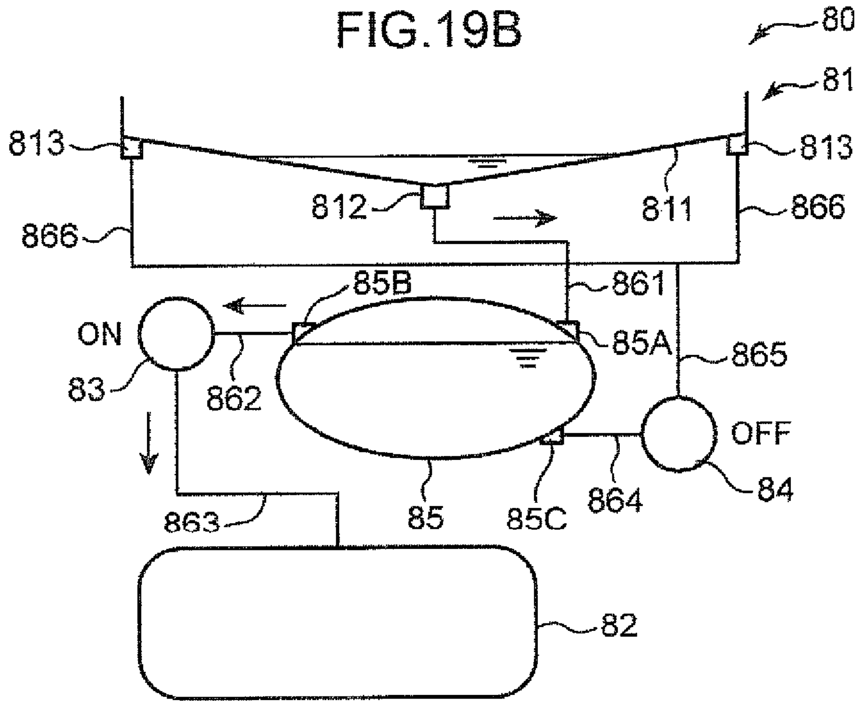

As illustrated in FIG. 19A, when the purge mechanism 60 performs the purge processing, a liquid is discharged from the head unit 51 as a waste liquid DW. The waste liquid DW discharged from the head unit 51 is received by each of the waste liquid receiving surfaces 811 of the waste liquid tray 81. At this time, the collection pump 83 is operated under control of the maintenance controller 92, and the waste liquid collection processing is performed. When the purge processing is performed, the circulation pump 84 is not operated.

When the collection pump 83 is operated, the waste liquid DW is discharged from the waste liquid discharge part 812 using suction force of the collection pump 83, and then flows into the storage hopper 85 from the hopper inflow part 85A through the first pipe 861. With an inflow of the waste liquid DW from the hopper inflow part 85A, a liquid level of the waste liquid DW in the storage hopper 85 rises. When the liquid level of the waste liquid DW in the storage hopper 85 reaches the first hopper outflow part 85B, the waste liquid DW flows out from the first hopper outflow part 85B. The waste liquid DW having flowed out of the first hopper outflow part 85B flows into the collection pump 83 through the second pipe 862, and then is fed from the collection pump 83 to flow into the collection tank 82 through the third pipe 863. This allows the waste liquid DW received by each of the waste liquid receiving surfaces 811 to be collected in the collection tank 82 (see FIG. 19B).

<Waste Liquid Circulation Processing>

When the collection pump 83 is operated to perform the waste liquid collection processing, the waste liquid DW is stored in the storage hopper 85 within a range where the liquid level is equal to or lower than the first hopper outflow part 85B. When the purge processing ends, the operation of the collection pump 83 is stopped. In this state, the circulation pump 84 is operated under control of the maintenance controller 92 to perform the waste liquid circulation processing.

When the circulation pump 84 is operated, suction force of the circulation pump 84 allows the waste liquid DW stored in the storage hopper 85 to flow out from the second hopper outflow part 85C. The waste liquid DW having flowed out of the second hopper outflow part 85C flows into the circulation pump 84 through the fourth pipe 864, and then is fed from the circulation pump 84 to flow into the waste liquid supply part 813 through the fifth pipe 865 and the sixth pipe 866 (see FIG. 20A). With an outflow of the waste liquid DW from the second hopper outflow part 85C, the liquid level of the waste liquid DW in the storage hopper 85 lowers.

When the waste liquid DW flows into the waste liquid supply part 813, the waste liquid DW is supplied to the upper end of the corresponding one of the waste liquid receiving surfaces 811 by the waste liquid supply part 813. The waste liquid DW supplied to the upper end flows toward the waste liquid discharge part 812 along the inclination of the corresponding one of the waste liquid receiving surfaces 811 (see FIG. 20B). The waste liquid DW having reached the waste liquid discharge part 812 is discharged from the waste liquid discharge part 812 and reaches the hopper inflow part 85A through the first pipe 861. This kind of operation of the circulation pump 84 enables the waste liquid DW to be circulated between the storage hopper 85 and each of the waste liquid receiving surfaces 811.

The waste liquid DW discharged from the head unit 51 in the purge processing contains thickened ink. Thus, the waste liquid DW returned to the upper end of each of the waste liquid receiving surfaces 811 by the operation of the circulation pump 84 has a flow velocity when flowing along the corresponding one of the waste liquid receiving surfaces 811, and has a discharge speed when discharged from the waste liquid discharge part 812, each of the flow velocity and the discharge speed being lower than a feeding speed of the waste liquid DW when the waste liquid DW is fed from the storage hopper 85 to the waste liquid supply part 813 by the circulation pump 84. In an extreme case, the waste liquid DW returned to the upper end of each of the waste liquid receiving surfaces 811 is accumulated on the corresponding one of the waste liquid receiving surfaces 811 without being discharged from the waste liquid discharge part 812 (see FIG. 21A).

An outflow of the waste liquid DW from the second hopper outflow part 85C by the operation of the circulation pump 84 continues until the liquid level of the waste liquid DW in the storage hopper 85 reaches the second hopper outflow part 85C. As described above, the amount of circulating waste liquid is defined by the amount of waste liquid DW stored in the storage hopper 85 within the range HH between the first hopper outflow part 85B and the second hopper outflow part 85C (FIG. 18). The amount of circulating waste liquid is set to be smaller than the maximum amount to be able to receive the waste liquid in the waste liquid tray 81. Thus, the waste liquid DW is prevented from overflowing from the waste liquid tray 81 (see FIG. 21A).

When the liquid level of the waste liquid DW in the storage hopper 85 reaches the second hopper outflow part 85C, the operation of the circulation pump 84 is stopped under control of the maintenance controller 92 (FIG. 21B), and the collection pump 83 is then operated.

Figure 22A:
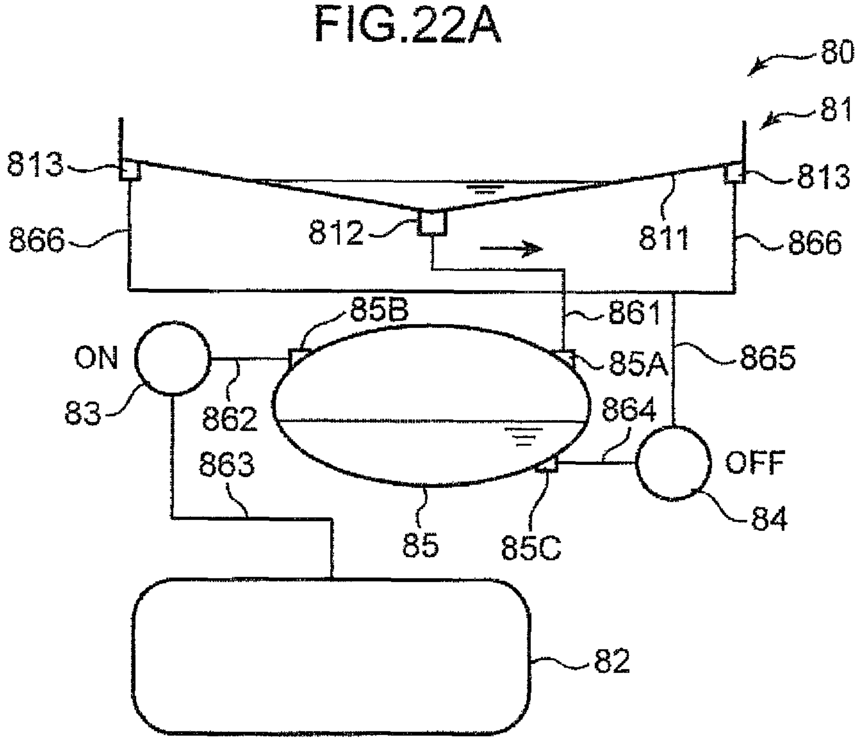
FIG. 22 is a diagram for illustrating a state in which a waste liquid collection apparatus performs waste liquid circulation processing.
Figure 22B:
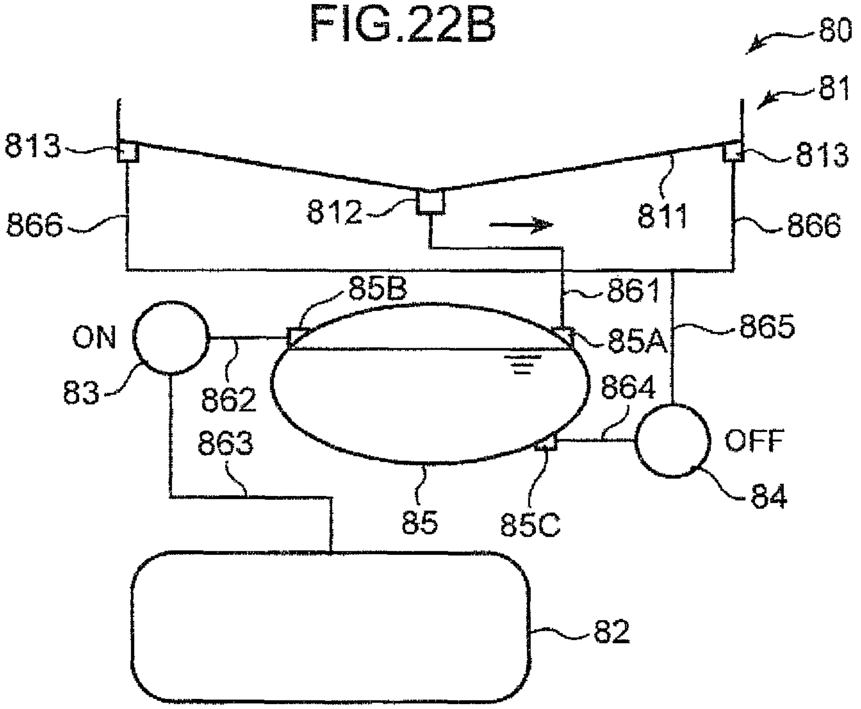

When the collection pump 83 is operated, the waste liquid DW accumulated on each of the waste liquid receiving surfaces 811 is discharged from the waste liquid discharge part 812 using the suction force of the collection pump 83, and then flows into the storage hopper 85 from the hopper inflow part 85A through the first pipe 861 (see FIG. 22A). With the inflow of the waste liquid DW from the hopper inflow part 85A, the liquid level of the waste liquid DW in the storage hopper 85 rises until reaching the first hopper outflow part 85B (see FIG. 22B). This allows every waste liquid DW on the waste liquid receiving surfaces 811 to be returned to the storage hopper 85.

As described above, the waste liquid collection apparatus 80 according to the present embodiment allows the circulation pump 84 to return the waste liquid DW discharged from the waste liquid discharge part 812 to the upper end of each of the waste liquid receiving surfaces 811 to circulate the waste liquid DW. This enables the amount of waste liquid DW flowing on each of the waste liquid receiving surfaces 811 to be apparently increased, so that the waste liquid DW can be prevented from stagnating on each of the waste liquid receiving surfaces 811 as much as possible. Thus, the waste liquid DW can be prevented from drying on each of the waste liquid receiving surfaces 811 and adhering in an aggregated state thereto, and thus can be appropriately collected.

The invention claimed is:

1. An inkjet recording apparatus, comprising:

a head unit capable of discharging ink; and a waste liquid collection apparatus that collects a liquid discharged from the head unit as a waste liquid in maintenance processing for the head unit, wherein the waste liquid collection apparatus includes:

a waste liquid tray that is disposed away from the head unit, the waste liquid tray including a waste liquid receiving surface inclined downward to receive the waste liquid discharged from the head unit and allow the waste liquid to flow from an upper end to a lower end of the waste liquid receiving surface, and a waste liquid discharge part that is disposed adjacent to the lower end of the waste liquid receiving surface to discharge the waste liquid having flowed along the waste liquid receiving surface;

a storage hopper that temporarily stores the waste liquid discharged from the waste liquid discharge part;

a collection tank that collects a first part of the waste liquid;

a collection pump connected between the storage hopper and the collection tank and feeding the first part of the waste liquid discharged from the waste liquid discharge part to the collection tank; and a circulation pump that returns a second part of the waste liquid discharged from the waste liquid discharge part to the upper end of the waste liquid receiving surface to circulate the second part of the waste liquid; wherein the waste liquid collection apparatus further includes:

a first pipe route connecting the storage hopper and the collection tank; and a second pipe route that is different from the first pipe route, the second pipe route being a circulating route connecting the storage hopper and the waste liquid tray.

2. The inkjet recording apparatus according to claim 1, wherein the waste liquid tray further includes a waste liquid supply part that is disposed adjacent to the upper end of the waste liquid receiving surface and supplies the waste liquid fed by the circulation pump to the upper end of the waste liquid receiving surface, and the circulation pump is connected between the storage hopper and the waste liquid supply part, and feeds the waste liquid stored in the storage hopper to the waste liquid supply part to circulate the waste liquid between the storage hopper and the waste liquid receiving surface.

3. The inkjet recording apparatus according to claim 2, wherein an amount of waste liquid circulated between the storage hopper and the waste liquid receiving surface by the circulation pump is set to be smaller than a maximum amount to be able to receive the waste liquid in the waste liquid tray.

4. The inkjet recording apparatus according to claim 1, further comprising:

a wiper blade that wipes off droplets that have adhered to the head unit;

a purge mechanism configured to perform purge processing of discharging pressurized liquid from the head unit as maintenance processing for the head unit; wherein the waste liquid collection apparatus collects a liquid discharged from the head unit and a liquid to drop along the wiper blade as the waste liquid by performing the purge processing.

5. The inkjet recording apparatus according to claim 1, further comprising:

a wipe unit arranged above the waste liquid tray and including the wiper blade.

6. The inkjet recording apparatus according to claim 5, wherein the wipe unit is retractable to a position displaced from a position below the head unit.

* * * * *